United States Patent
Kawamura et al.

(10) Patent No.: US 8,628,899 B2
(45) Date of Patent: Jan. 14, 2014

(54) AZO COMPOUND, AND PIGMENT DISPERSANT, PIGMENT COMPOSITION, PIGMENT DISPERSION AND TONER INCLUDING THE AZO COMPOUND

(75) Inventors: Masashi Kawamura, Yokohama (JP); Yuki Hasegawa, Yokohama (JP); Masatake Tanaka, Yokohama (JP); Takayuki Toyoda, Yokohama (JP); Kei Inoue, Yokohama (JP); Yasuaki Murai, Kawasaki (JP); Masashi Hirose, Machida (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/510,606

(22) PCT Filed: Aug. 23, 2011

(86) PCT No.: PCT/JP2011/069365
§ 371 (c)(1),
(2), (4) Date: May 17, 2012

(87) PCT Pub. No.: WO2012/026607
PCT Pub. Date: Mar. 1, 2012

(65) Prior Publication Data
US 2012/0231388 A1   Sep. 13, 2012

(30) Foreign Application Priority Data

Aug. 27, 2010   (JP) .................................. 2010-190325

(51) Int. Cl.
*G03G 9/09* (2006.01)
*C09B 43/12* (2006.01)

(52) U.S. Cl.
USPC ................. 430/108.22; 430/108.23; 524/189; 525/329.9

(58) Field of Classification Search
USPC ........................ 430/108.22, 108.23; 524/189; 525/329.9
See application file for complete search history.

(56) References Cited

U.S. PATENT DOCUMENTS 6,586,151 B1   7/2003  Naka et al.
6,703,176 B2   3/2004  Naka et al.
(Continued)

FOREIGN PATENT DOCUMENTS

EP   0 193 052 A1   9/1986
EP   0 763 580 A2   3/1997
(Continued)

OTHER PUBLICATIONS

International Preliminary Report on Patentability dated Mar. 14, 2013 in International Application No. PCT/JP2011/069365.
(Continued)

*Primary Examiner* — Hoa V Le

(74) *Attorney, Agent, or Firm* — Fitzpatrick, Cella, Harper and Scinto

(57) ABSTRACT

There is provided an azo compound for improvement in the dispersibility of an azo pigment into a water-insoluble solvent. The azo compound is represented by the following general formula (1):

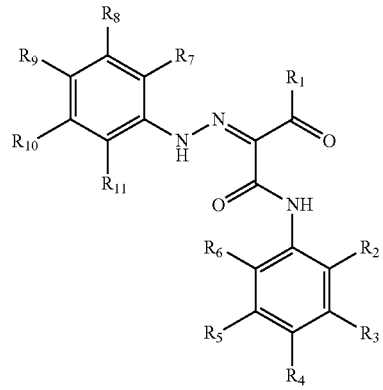

14 Claims, 3 Drawing Sheets

(56) References Cited

U.S. PATENT DOCUMENTS

| | | |
|---|---|---|
| 6,803,164 B2 | 10/2004 | Mizoo et al. |
| 6,813,449 B2 | 11/2004 | Miyazaki et al. |
| 6,953,646 B2 | 10/2005 | Doujo et al. |
| 7,123,862 B2 | 10/2006 | Hasegawa et al. |
| 7,141,342 B2 | 11/2006 | Toyoda et al. |
| 7,160,660 B2 | 1/2007 | Dojo et al. |
| 7,264,910 B2 | 9/2007 | Toyoda et al. |
| 7,288,357 B2 | 10/2007 | Toyoda et al. |
| 7,368,211 B2 | 5/2008 | Hasegawa et al. |
| 7,470,494 B2 | 12/2008 | Nishiyama et al. |
| 7,582,152 B2 | 9/2009 | Jaunky et al. |
| 7,582,401 B2 | 9/2009 | Ogawa et al. |
| 7,678,524 B2 | 3/2010 | Hasegawa et al. |
| 7,704,659 B2 | 4/2010 | Ogawa et al. |
| 7,811,734 B2 | 10/2010 | Ogawa et al. |
| 7,833,685 B2 | 11/2010 | Tanaka et al. |
| 7,833,687 B2 | 11/2010 | Kato et al. |
| 7,939,231 B2 | 5/2011 | Ogawa et al. |
| 8,084,174 B2 | 12/2011 | Hasegawa et al. |
| 8,124,306 B2 | 2/2012 | Hirata et al. |
| 8,211,606 B2 | 7/2012 | Murai et al. |
| 2004/0194665 A1 | 10/2004 | Konemann et al. |
| 2011/0311910 A1 | 12/2011 | Matsui et al. |
| 2012/0040285 A1 | 2/2012 | Shibata et al. |
| 2012/0094226 A1 | 4/2012 | Tani et al. |
| 2012/0231384 A1 | 9/2012 | Aoki et al. |

FOREIGN PATENT DOCUMENTS

| | | |
|---|---|---|
| JP | 6-262861 A | 9/1994 |
| JP | 2003-255613 A | 9/2003 |
| JP | 3984840 B2 | 10/2007 |
| JP | 4254292 B2 | 4/2009 |
| WO | 99/42532 A1 | 8/1999 |
| WO | 2007/006637 A2 | 1/2007 |

OTHER PUBLICATIONS

Ponde, et al., "Selective Catalytic Transesterification, Transthiolesterification, and Protection of Carbonyl Compounds over Natural Kaolinitic Clay", J. Org. Chem., vol. 63, No. 4, 1998, pp. 1058-1063.

Sai, et al., "Knorr Cyclizations and Distonic Superelectrophiles", J. Org. Chem, vol. 72, No. 25, 2007, pp. 9761-9764.

Matyjaszewski, et al., "Atom Transfer Radical Polymerization", Chem. Rev., vol. 101, 2001, pp. 2921-2990.

Peyser, et al., "Glass Transition Temperatures of Polymers", Polymer Handbook, 3rd edition, 1989, pp. 209-277.

PCT International Search Report and Written Opinion of the International Searching Authority, International Application No. PCT/JP2011/069365, Mailing Date Nov. 15, 2011.

Chinese Office Action dated Aug. 23, 2013 in Chinese Application No. 201180041635.0.

AZO COMPOUND, AND PIGMENT DISPERSANT, PIGMENT COMPOSITION, PIGMENT DISPERSION AND TONER INCLUDING THE AZO COMPOUND

TECHNICAL FIELD

The present invention relates to a novel azo compound, a pigment dispersant, a pigment composition and a pigment dispersion, containing the azo compound, and a toner having the pigment composition as a coloring agent.

BACKGROUND ART

A fine pigment is likely to have a strong cohesive force between pigment particles in a medium such as an organic solvent or a melted resin. Therefore, color unevenness and a remarkable decrease in coloring power are brought about in drawdowns in some cases. A further problem that occurs is a decrease in gloss of colored surfaces and coated surfaces of drawdowns.

As a method of improving the pigment dispersibility, polymer dispersants having sites having affinity for pigments and polymer sites to impart the dispersibility in media have conventionally been used. For example, a polymer pigment dispersant for a toner is known in which an azo or a disazo chromophore containing a substitution product of acetoacetanilides is bonded to a polymer (see Patent Literature 1). An example is disclosed which uses a comb polymer dispersant, known as SOLSPERSE (registered trademark), having an acid or basic site (see Patent Literature 2). On the other hand, an example is disclosed which uses a polymer dispersant as a dispersant for a pigment for inkjet recording in which polymer dispersant a chromophore having a lower molecular weight than 95% of the molecular weight of an azo pigment is bonded to a water-soluble polymer main chain (see Patent Literature 3).

CITATION LIST

Patent Literature

PTL 1: Japanese Patent No. 3984840
PTL 2: WO 99-42532
PTL 3: U.S. Pat. No. 7,582,152

SUMMARY OF INVENTION

Technical Problem

Although propositions as described above have been made, for the cases where toners are produced using these pigment dispersants, it is difficult to satisfactorily disperse pigments in binder resins, and it is also difficult to obtain desired color tones.

It is an object of the present invention to solve the above-mentioned problems. That is, it is an object of the present invention to provide a pigment dispersant having high affinity for pigments and concurrently having high affinity for polymerizable monomers, binder resins, water-insoluble solvents and the like, and to provide a toner having good color tone by applying a pigment composition using the pigment dispersant as a coloring agent for a toner.

Solution to Problem

The above-mentioned object can be achieved by the following present invention.

That is, the present invention relates to an azo compound represented by the following general formula (1):

General formula (1)

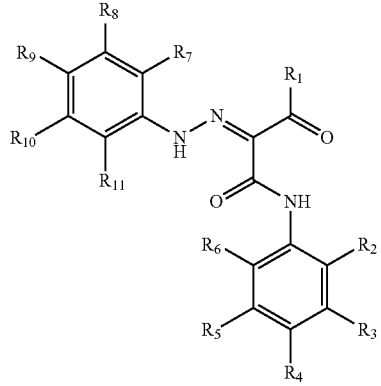

wherein $R_1$ represents an alkyl group having 1 to 6 carbon atoms, or a phenyl group; $R_2$ to $R_6$ each represent a hydrogen atom, or a polymer containing a partial structural formula represented by the following general formula (2) shown below, and at least one of $R_2$ to $R_6$ is the polymer; $R_7$ to $R_{11}$ each represent a hydrogen atom, a $COOR_{12}$ group, or a $CONR_{13}R_{14}$ group, and at least one of $R_7$ to $R_{11}$ is the $COOR_{12}$ group, or the $CONR_{13}R_{14}$ group; and $R_{12}$ to $R_{14}$ represent a hydrogen atom, or an alkyl group having 1 to 3 carbon atoms:

General formula (2)

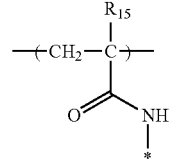

wherein $R_{15}$ represents a hydrogen atom, or an alkyl group having 1 or 2 carbon atoms; and * is a bonding position through which the polymer is bonded to the azo compound as $R_2$ to $R_6$ in the general formula (1).

The present invention further provides a pigment dispersant, a pigment composition, a pigment dispersion and a toner including at least a novel azo compound represented by the general formula (1) shown above.

Advantageous Effects of Invention

According to the present invention, a novel azo compound is provided. The azo compound according to the present invention and represented by the general formula (1) shown above, since having affinity for water-insoluble solvents, especially non-polar solvents, and high affinity for azo pigments, especially acetoacetanilide-based pigments, provides a pigment composition improved in the dispersibility of azo pigments by using the pigment composition as a pigment dispersant. Use of the pigment composition further provides a pigment dispersion excellent in the dispersibility into water-insoluble solvents, especially a pigment dispersion of a styrene monomer. Use of the pigment composition as a coloring agent still further provides a toner good in the color tone.

DESCRIPTION OF EMBODIMENTS

Figure 1:
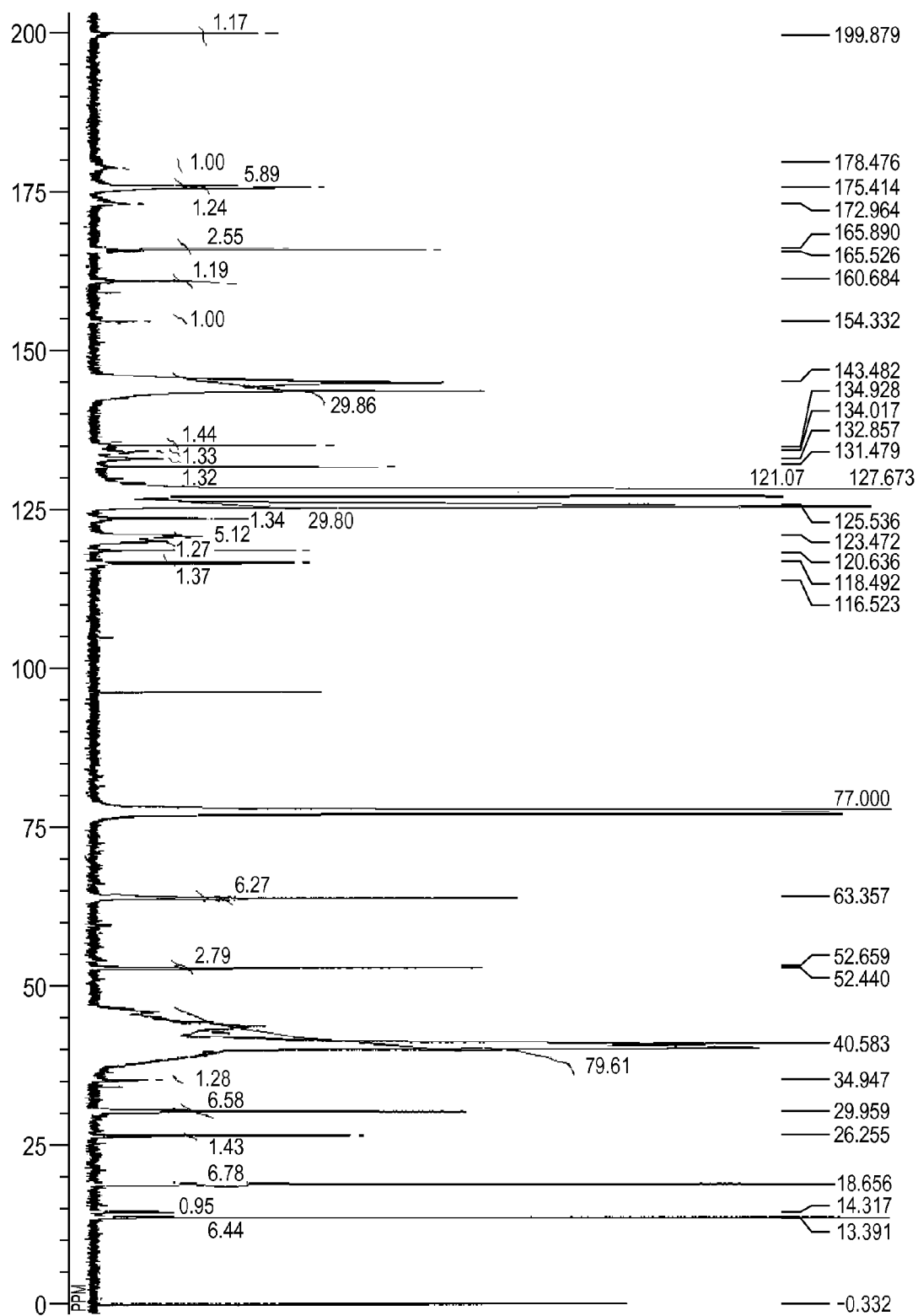
FIG. 1 is a $^{13}$C-NMR spectrum diagram of the azo compound (27) according to the present invention.

Hereinafter, the present invention will be described in more detail.

As a result of exhaustive studies to solve the above-mentioned problems, the present inventors have found that an azo compound represented by the general formula (1) shown above has high affinity for azo pigments and water-insoluble solvents, and improves the dispersibility of azo pigments into water-insoluble solvents. It has been found also that the use of the azo compound further provides an azo pigment composition good in the dispersibility, and the use of the pigment composition still further provides an azo pigment dispersion good in the dispersion state, and a toner good in the color tone. These findings have led to the present invention.

The azo compound according to the present invention is constituted of a colorant site (a moiety excluding a polymer moiety in a compound represented by the general formula (1)) having high affinity for azo pigments and of a polymer site having a partial structural formula represented by the general formula (2) and having high affinity for water-insoluble solvents.

First, the colorant site provided in the present invention will be described in detail. As described above, the colorant site is a moiety excluding a polymer moiety in a compound represented by the general formula (1).

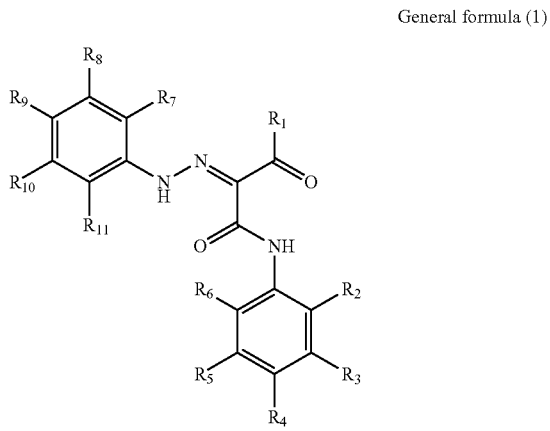

General formula (1)

wherein $R_1$ represents an alkyl group having 1 to 6 carbon atoms, or a phenyl group; $R_2$ to $R_6$ each represent a hydrogen atom, or a polymer containing a partial structural formula represented by the following general formula (2) shown below, and at least one of $R_2$ to $R_6$ is the polymer; $R_7$ to $R_{11}$ each represent a hydrogen atom, a $COOR_{12}$ group, or a $CONR_{13}R_{14}$ group, and at least one of $R_7$ to $R_{11}$ is the $COOR_{12}$ group, or the $CONR_{13}R_{14}$ group; and $R_{12}$ to $R_{14}$ represent a hydrogen atom, or an alkyl group having 1 to 3 carbon atoms.

The alkyl group in $R_1$ in the general formula (1) shown above is not limited as long as having 1 to 6 carbon atoms, but examples thereof include straight chain, branched chain or cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group and a cyclohexyl group.

$R_1$ in the general formula (1) shown above may have a substituent unless remarkably inhibiting affinity for pigments. Examples of the substituent in this case include a halogen atom, a nitro group, an amino group, a hydroxyl group, a cyano group and a trifluoromethyl group.

$R_1$ in the general formula (1) shown above can be optionally selected from an alkyl group having 1 to 6 carbon atoms and a phenyl group, but is preferably a methyl group from the viewpoint of affinity for pigments.

At least one of $R_2$ to $R_6$ in the general formula (1) shown above represents a polymer including a partial structural formula represented by the general formula (2), and the remainder represents a hydrogen atom. The polymer is preferably bonded to the position of $R_4$ in the general formula (1) from the viewpoint of affinity for pigments.

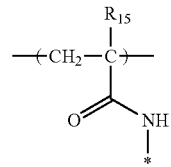

General formula (2)

wherein $R_{15}$ represents a hydrogen atom, or an alkyl group having 1 or 2 carbon atoms; and * is a bonding position through which the polymer is bonded to the azo compound as $R_2$ to $R_6$ in the general formula (1).

$R_7$ to $R_{11}$ in the general formula (1) shown above are selected from a hydrogen atom, a $COOR_{12}$ group and a $CONR_{13}R_{14}$ group, and at least one of $R_7$ to $R_{11}$ therein can be selected so as to be the $COOR_{12}$ group or the $CONR_{13}R_{14}$ group; but it is preferable that $R_7$ and $R_{10}$ are each a $COOR_{12}$ group, and $R_8$, $R_9$ and $R_{11}$ are each a hydrogen atom, from the viewpoint of affinity for pigments.

Examples of an alkyl group in $R_{12}$ to $R_{14}$ in the general formula (1) shown above include a methyl group, an ethyl group, a n-propyl group and an isopropyl group. $R_{12}$ to $R_{14}$ can be optionally selected from the alkyl groups as described above and a hydrogen atom, but in the case of a $COOR_{12}$ group, $R_{12}$ is preferably a methyl group, and in the case of a $CONR_{13}R_{14}$ group, $R_{13}$ is preferably a methyl group, and $R_{14}$ is preferably a hydrogen atom or a methyl group, from the viewpoint of affinity for pigments.

Then, a polymer moiety including a partial structural formula represented by the general formula (2) will be described.

Examples of an alkyl group in $R_{15}$ in the general formula (2) shown above include a methyl group and an ethyl group. $R_{15}$ can be optionally selected from the alkyl groups as described above and a hydrogen atom, but is preferably a hydrogen atom or a methyl group from the viewpoint of the reactivity.

A polymer including a partial structural formula represented by the general formula (2) shown above is not limited as long as having good affinity for water-insoluble solvents, but is especially preferably a case where the polymer includes at least a partial structural formula represented by the following general formula (4) or the following general formula (5).

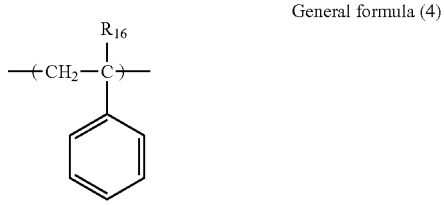

General formula (4)

wherein $R_{16}$ represents a hydrogen atom or an alkyl group having 1 or 2 carbon atoms.

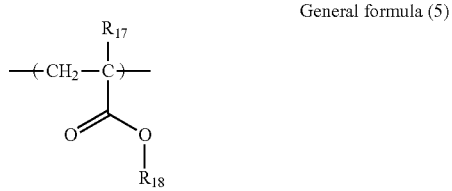

General formula (5)

wherein $R_{17}$ represents a hydrogen atom or an alkyl group having 1 or 2 carbon atoms; and $R_{18}$ represents an alkyl group having 1 to 22 carbon atoms, or an aralkyl group having 7 or 8 carbon atoms.

A partial structural formula represented by the following general formula (3) may be included in the polymer.

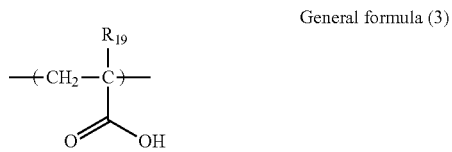

General formula (3)

wherein $R_{19}$ represents a hydrogen atom or an alkyl group having 1 or 2 carbon atoms.

Examples of an alkyl group in $R_{19}$ in the general formula (3) shown above include a methyl group and an ethyl group. $R_{19}$ can be optionally selected from the alkyl groups as described above and a hydrogen atom, but is preferably a hydrogen atom or a methyl group from the viewpoint of the reactivity.

The partial structural formula represented by the general formula (3) is an unreacted residue which has not formed an amido bond with an amino group of a colorant site of a compound (colorant intermediate, which is a compound before a polymer is bonded thereto) in the pre-stage of the general formula (1) shown above. Therefore, $R_{19}$ in the general formula (3) is the same substituent as $R_{15}$ in the general formula (2) shown above. When an amido bond is formed by the reaction of a carboxyl group with an amino group, the "*" site in the general formula (2) bonds to sites corresponding to $R_2$ to $R_6$ in the general formula (1).

Examples of an alkyl group in $R_{16}$ in the general formula (4) shown above include a methyl group and an ethyl group. $R_{16}$ can be optionally selected from the alkyl groups as described above and a hydrogen atom, but is preferably a hydrogen atom or a methyl group from the viewpoint of the reactivity.

Examples of an alkyl group in $R_{17}$ in the general formula (5) shown above include a methyl group and an ethyl group. $R_{17}$ can be optionally selected from the alkyl groups as described above and a hydrogen atom, but is preferably a hydrogen atom or a methyl group from the viewpoint of the reactivity.

Examples of an alkyl group in $R_{18}$ in the general formula (5) shown above include straight chain, branched chain or cyclic alkyl groups such as a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-behenyl group, an isopropyl group, an isobutyl group, an isodecyl group, a sec-butyl group, a tert-butyl group, a 2-ethylhexyl group, a cyclopentyl group and a cyclohexyl group.

Examples of an aralkyl group in $R_{18}$ in the general formula (5) shown above include a benzyl group and a phenethyl group.

$R_{18}$ in the general formula (5) shown above can be optionally selected from alkyl groups and aralkyl groups, but is preferably a case of $R_{18}$ having 4 or more carbon atoms from the viewpoint of excellent affinity for dispersion media.

The respective repeating numbers of the partial structural formulae of the general formulae (2) to (5) shown above are taken as k, l, m and n.

The repeating number k of the general formula (2) comes to represent a presence number of colorant sites (sites excluding a polymer moiety in a compound of the general formula (1) shown above) present on one molecular chain of the polymer moiety. The proportion of k, since largely influencing affinity for pigments, is preferably in a ratio of k to (l+m+n) in the range of 1:99 to 50:50. In order to securing sufficient affinity for pigments and holding affinity for dispersion media, the ratio is more preferably in the range of 3:97 to 30:70.

The repeating number represents an average value of presence numbers of the each partial structural formula. Since a polymer has a molecular weight distribution, the value does not represent an unambiguous composition according to the numerical value.

The general formula (3) shown above is an unreacted residue in a polymer site as described above. Therefore, in the case where the carboxyl group in the general formula (3) is completely amidated with a colorant site of the general formula (1), l is 0. By contrast, with a large l value, since the affinity for water-insoluble solvents, especially non-polar solvents, decreases, the ratio of l to (k+m+n) is preferably in the range of 0:100 to 30:70.

The affinity for dispersion media can be controlled by varying proportions occupied according to the repeating numbers m and n of the partial structural formulae of the general formulae (4) and (5) shown above, in a copolymer site. In the case where the dispersion medium is a non-polar solvent like styrene, making the proportion of m large is preferable from the viewpoint of affinity for the dispersion medium; and in the case where the dispersion medium is a solvent having a polarity of some degree like acrylate esters, making the proportion of n large is preferable similarly from the viewpoint of affinity for the dispersion medium. Here, the case where m and n are simultaneously 0 is not preferable because the affinity of a polymer site for water-insoluble solvents, especially non-polar solvents, is damaged.

The polymer may have other copolymerization components unless remarkably inhibiting the affinity for a dispersion medium. Other than the monomers imparting the partial structures of the general formulae (3) to (5) shown above, usable examples thereof are methacrylamides such as methacrylamide, N-methylmethacrylamide, N-ethylmethacrylamide, N-isopropylmethacrylamide, N,N-dimethylmethacrylamide and N,N-diethylmethacrylamide, acrylamides such as acrylamide, N-methylacrylamide, N-ethylacrylamide, N-isopropylacrylamide, N,N-dimethylacrylamide and N,N-diethylacrylamide, vinylbenzoic acids such as 3-vinylbenzoic acid and 4-vinylbenzoic acid, vinylsulfonic acids such as vinylsulfonic acid and styrenesulfonic acid, alkylsulfonic acid methacrylates or alkylsulfonic acid methacrylamides such as methacryloxypropylsulfonic acid, 2-hydroxy-3-methacryloxypropylsulfonic acid, 2-methacryloylamino-2,2-dimethylethanesulfonic acid, 2-methacryloxyethanesulfonic acid, 2-methacrylamide-2-methylpropanesulfonic acid and 3-methacrylamide-2-hydroxypropanesulfonic acid, and alkylsulfonic acid acrylates or alkylsulfonic acid acrylamides such as acryloxypropylsulfonic acid, 2-hydroxy-3-acryloxypropylsulfonic acid, 2-acryloylamino-2,2-dimethylethanesulfonic acid, 2-acryloxyethanesulfonic acid, 2-acrylamide-2-methylpropanesulfonic acid and 3-acrylamide-2-hydroxypropanesulfonic acid, vinyl alcohols such as vinyl alcohol, hydroxyalkyl methacrylates such as 2-hydroxyethyl methacrylate, 2 (or 3)-hydroxypropyl methacrylate, 2 (or 3 or 4)-hydroxybutyl methacrylate and cyclohexanedimethanol monomethacrylate, hydroxyalkyl acrylates such as 2-hydroxyethyl acrylate, 2 (or 3)-hydroxypropylacrylate, 2 (or 3 or 4)-hydroxybutylacrylate and cyclohexanedimethanol monoacrylate, hydroxyalkyl methacrylamides such as N-(2-hydroxyethyl)methacrylamide, N-(2-hydroxypropyl)methacrylamide and N-(2-hydroxybutyl)methacrylamide, hydroxyalkylacrylamides such as N-(2-hydroxyethyl)acrylamide, N-(2-hydroxypropyl)acrylamide and N-(2-hydroxybutyl)acrylamide, vinylpyridines such as 2-vinylpyridine, 4-vinylpyridine, 5-methyl-2-vinylpyridine and 5-ethyl-2-vinylpyridine, and vinylpyrrolidones such as 1-vinyl-2-pyrrolidone, 1-vinyl-3-pyrrolidone, 3-vinyl-2-pyrrolidone, 4-vinyl-2-pyrrolidone and 5-vinyl-2-pyrrolidone. The proportion of these other copolymerization components can be optionally set according to the affinity for a dispersion medium, but is preferably 0 mol % or more and 30 mol % or less from the viewpoint of the affinity of the copolymer for a water-insoluble solvent.

The polymer described above preferably has a number-average molecular weight (Mn) of 500 or higher from the viewpoint of improving of the dispersibility of pigments. From the viewpoint of affinity for water-insoluble solvents, the number-average molecular weight (Mn) of the polymer is preferably 200,000 or lower. Additionally, in consideration of the easiness of the production, the number-average molecular weight of the polymer is more preferably in the range of 2,000 to 50,000.

The polymerization form of the polymer described above may be a random copolymer or a block copolymer, but is suitably a block copolymer in which sites having affinity for pigments and sites having affinity for water-insoluble solvents are controlled in regard to stereoregularity. In the present invention, preferable is a block copolymer of segments of the partial structural formulae represented by the general formula (2) and the general formula (3) shown above and segments of the partial structural formulae represented by the general formula (4) and the general formula (5) shown above.

In the azo compound represented by the general formula (1) shown above, although tautomers having structures of the following general formulae (7), (8) and others are present as shown in the scheme described below, these tautomers are also included within the scope of the right of the present invention.

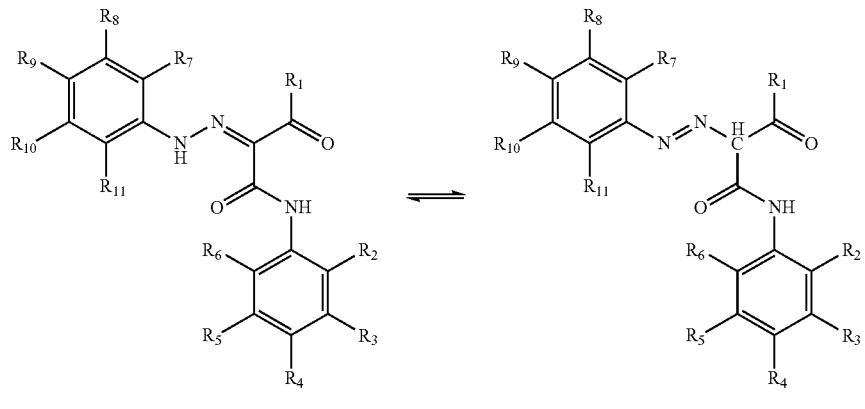

General formula (1)        General formula (7)

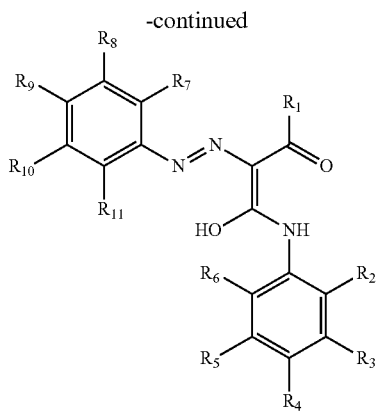
General formula (8)
wherein in the general formulae (7) and (8), $R_1$ to $R_{11}$ each have the same meaning as $R_1$ to $R_{11}$ in the general formula (1).
The azo compound represented by the general formula (1) according to the present invention can be produced, for example, by a method shown in the following Production Method 1 or 2.
(Production Method 1)
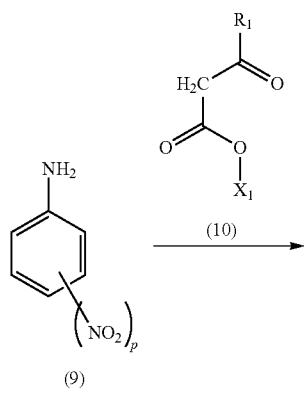
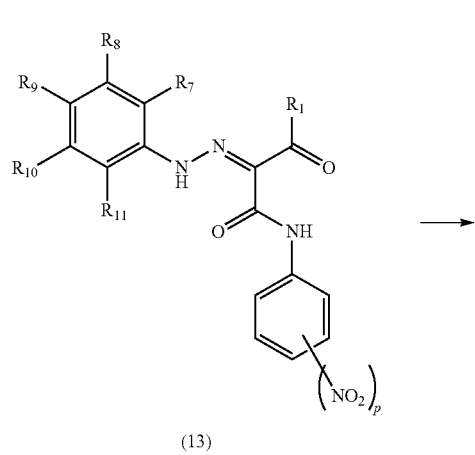
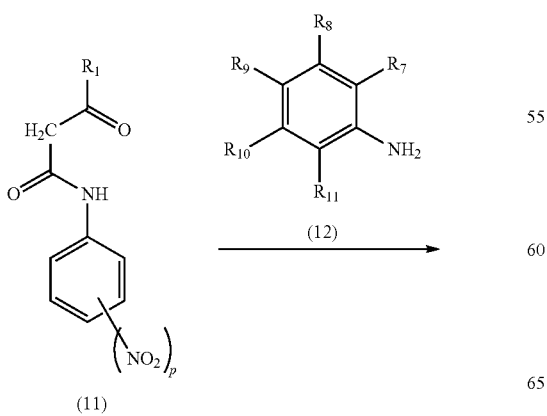

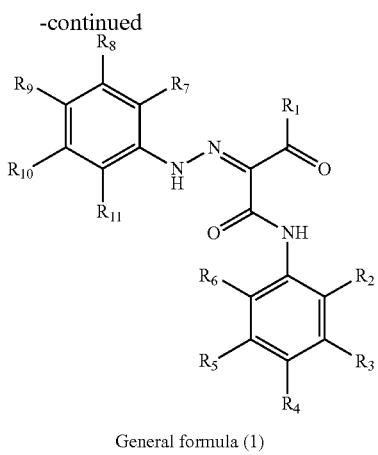

General formula (1)

wherein $R_1$ and $R_7$ to $R_{11}$ in compounds (10) to (14) are the same meaning as $R_1$ and $R_7$ to $R_{11}$ in the general formula (1) shown above; $P_1$ represents a polymer including a partial structural formula of the general formula (3) shown above; $X_1$ represents a leaving group; and p represents an integer of 1 to 5.

First, Production Method 1 will be described. Production Method 1 of the azo compound according to the present invention has the following four steps. [I] A step of amidating an aniline derivative represented by a compound (9) and a compound (10) to obtain an acetoacetanilide analogue represented by a compound (11) (hereinafter, a first step). [II] A step of coupling the compound (11) obtained in the first step and a diazo component of an aniline analogue represented by a compound (12) to obtain a colorant intermediate represented by a compound (13) (hereinafter, a second step). [III] a step of reducing a nitro group of the compound (13) obtained in the second step with a reducing agent to an amino group to obtain a colorant intermediate represented by a compound (14) (hereinafter, a third step). [IV] A step of amidating an amino group of the colorant intermediate represented by the compound (14) obtained in the third step and a carboxyl group of a separately synthesized copolymer (15) represented by $P_1$ to obtain an azo compound represented by the general formula (1) shown above (hereinafter, a fourth step). Hereinafter, each step of Production Method 1 will be described.

[I] The First Step

The first step of Production Method 1 according to the present invention can utilize a well-known method (for example, "Journal of Organic Chemistry", 1998, vol. 63, No. 4, 1058-1063). In the case where $R_1$ in the compound (10) shown above is a methyl group, the synthesis can be carried out by a method using a diketene in place of the compound (10) shown above (for example, "Journal of Organic Chemistry", 2007, vol. 72, No. 25, 9761-9764). The compound (10) is commercially available as various types. Alternatively, the compound can be easily synthesized by well-known methods.

Although the present step can be carried out solventlessly, the step is preferably carried out in the presence of a solvent in order to prevent a rapid progress of the reaction. The solvent is not especially limited unless inhibiting the reaction, but for example, a high-boiling point solvent such as toluene or xylene can be used.

[II] The Second Step

The second step in Production Method 1 according to the present invention may carry out a coupling, for example, by a following method. First, in hydrochloric acid, a sodium nitrite aqueous solution is added to the compound (12) shown above, which is then diazotized by a common method. After the diazotization, the compound (11) shown above is added to the solution to carry out the coupling reaction. A compound produced by discharging the reaction liquid into a poor solvent or otherwise is filtered off to obtain the compound (13) shown above. Here, the coupling reaction is not limited to this method.

[III] The Third Step

The third step in Production Method 1 according to the present invention may carry out a reduction reaction of a nitro group, for example, by a following method. First, the compound (13) shown above is dissolved in a solvent such as an alcohol; and a nitro group of the compound (13) is reduced to an amino group in the presence of a reducing agent and at normal temperature or under heating, to obtain the compound (14) shown above. The reducing agent is not especially limited, but examples thereof include sodium sulfide, sodium hydrogensulfide, sodium hydrosulfide, sodium polysulfide, metallic tin, $SnCl_2$ and $SnCl_2.2H_2O$. The reduction reaction may be progressed using a method in which a hydrogen gas is allowed to contact in the presence of a catalyst in which a metal such as nickel, platinum or palladium is carried on an insoluble carrier such as active carbon.

[IV] The Fourth Step

The fourth step in Production Method 1 according to the present invention may carry out a coupling, for example, by a following method. That is, the compound (14) shown above and the copolymer (15) described above are dissolved in a solvent such as chloroform or dehydrated tetrahydrofuran; a condensing agent is added in a nitrogen atmosphere and a condensation reaction is carried out at normal temperature or under heating to obtain an azo compound represented by the general formula (1) shown above.

A condensing agent usable in the fourth step is not especially limited, but examples thereof include dicyclohexylcarbodiimide (DCC), 1-ethyl-3-(3-dimethylaminopropyl)carbodiimide hydrochloride (EDC.HCl) and 1-hydroxybenzotriazol monohydrate (HOBt).

Other than the coupling method using the condensing agent described above, a method can be applied to the present step in which method the copolymer (15) shown above is converted to an acid halide, and then amidated with the compound (14) described above. Specifically, the copolymer (15) is dissolved in a solvent such as chloroform; thionyl chloride is dropped in the solution in a nitrogen atmosphere to be reacted at normal temperature, preferably under heating; and thereafter, unreacted thionyl chloride is distilled off to obtain a carboxylic acid chloride of the copolymer (15). Then, the compound (14) and a base such as triethylamine are dissolved in a solvent such as chloroform; the carboxylic acid chloride is dropped in the solution in a nitrogen atmosphere to be subjected to an amidation reaction under the ice-cooling condition (under heating in some cases) to obtain an azo compound represented by the general formula (1) shown above.

(Production Method 2)

Then, Production Method 2 will be described.

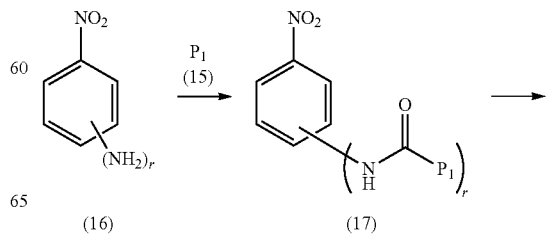

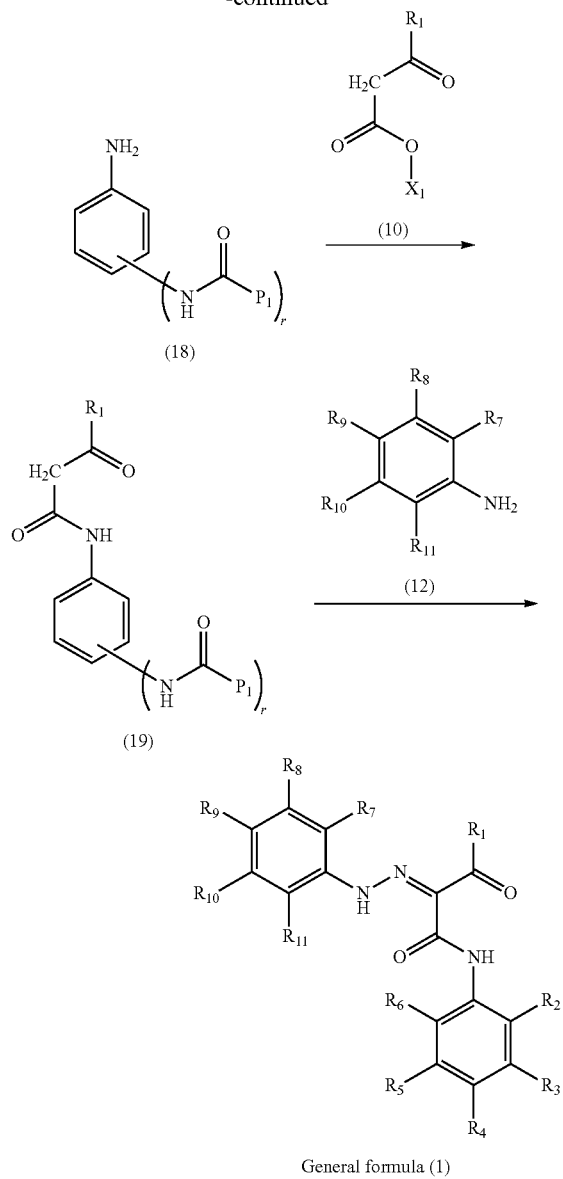

General formula (1)

wherein $R_1$ and $R_7$ to $R_{11}$ in compounds (10), (12), and (15) to (19) have the same meaning as $R_1$ and $R_7$ to $R_{11}$ in the general formula (1) shown above; $P_1$ represents a polymer including a partial structural formula of the general formula (3) shown above; $X_1$ represents a leaving group; and r represents an integer of 1 to 5.

Production Method 2 of the azo compound according to the present invention has the following four steps. [i] A step of amidating an aniline derivative represented by a compound (16) and a copolymer site represented by a compound (15) to obtain a compound (17) (hereinafter, a first step). [ii] A step of reducing a nitro group of the compound (17) obtained in the first step with a reducing agent to an amino group to obtain a compound (18) (hereinafter, a second step). [iii] A step of amidating the compound (18) obtained in the second step and a compound (10) to obtain a compound (19) (hereinafter, a third step). [IV] A step of coupling the compound (19) obtained in the third step and a diazo component of an aniline analogue represented by a compound (12) to obtain an azo compound represented by the general formula (1) shown above (hereinafter, a fourth step).

The first step of Production Method 2 can be carried out by a method described in the fourth step of Production Method 1 described above. Similarly, the second step of Production Method 2 corresponds to the third step of Production Method 1; the third step of Production Method 2, the first step of Production Method 1; and the fourth step of Production Method 2, the second step of Production Method 1.

For the compounds obtained in each step of Production Method 1 or 2 described above, common methods for isolation and purification of organic compounds can be used. Examples of the isolation and purification methods include a recrystallization method and a reprecipitation method using an organic solvent, and column chromatography using silica gel or the like. These compounds can be obtained in high purities by purifying these by the one method singly or a method in combination of two or more.

Then, a method for producing a polymer site represented by the general formula (15) shown above containing partial structural formulae represented by the general formulae (3) to (5).

The polymerization method of the copolymer can utilize a well-known method (for example, "Chem. Reviews", 2001, vol. 101, 2921-2990).

The copolymer can be obtained by copolymerizing plural kinds of vinyl group-containing monomers including α-substituted acrylic acid represented by a partial structural formula of the general formula (3) shown above by various types of polymerization methods.

The polymerization method of the copolymer includes the radical polymerization and the ionic polymerization, and also the living polymerization having a purpose of controls of the molecular weight distribution and the structure may be used. Industrially, the radical polymerization is preferably used.

The radical polymerization can be carried out by the use of a radical polymerization initiator, irradiation with radiation or light such as laser light, the concurrent use of a photopolymerization initiator and irradiation with light, heating, and the like.

The radical polymerization initiator is any one as long as generating a radical and being capable of initiating a polymerization reaction, and is selected from compounds to generate a radical by an action of heat, light, radiation, redox reaction or the like. Examples thereof include azo compounds, organic peroxides, inorganic peroxides, organometal compounds and photopolymerization initiators. More specific examples thereof include azo-based polymerization initiators such as 2,2'-azobis(isobutyronitrile), 2,2'-azobis(2-methylbutyronitrile), 2,2'-azobis(4-methoxy-2,4-dimethylvaleronitrile) and 2,2'-azobis(2,4-dimethylvaleronitrile), organic peroxide-based polymerization initiators such as benzoyl peroxide, di-tert-butyl peroxide, tert-butylperoxyisopropyl carbonate, tert-hexylperoxybenzoate and tert-butylperoxybenzoate, inorganic peroxide-based polymerization initiators such as potassium persulfate and ammonium persulfate, and redox initiators such as a hydrogen peroxide-ferric system, a benzoyl peroxide-dimethylaniline system and a cerium (IV) salt-alcohol-based system. The photopolymerization initiators include benzophenone-based, benzoin-based, acetophenone-based and thioxanthone-based ones. These radical polymerization initiators may be used concurrently in two or more.

The amount of a polymerization initiator used herein is preferably regulated so as to provide a polymer having a target molecular weight distribution in the range of 0.1 to 20 parts by mass with respect to 100 parts by mass of monomers.

The polymer can be produced also using any one of methods of solution polymerization, suspension polymerization, emulsion polymerization, dispersion polymerization, precipitation polymerization, bulk polymerization and the like, and is not especially limited.

The polymer is copolymerized, in order to copolymerize mixed plural kinds of monomers having different polarities from each other, desirably in a solvent having affinity for the each monomer. Specific examples of the solvent include polar organic solvents including alcohols such as methanol, ethanol, and 2-propanol, ketones such as acetone and methyl ethyl ketone, ethers such as tetrahydrofuran and diethyl ether, ethylene glycol monoalkyl ethers or acetates thereof, propylene glycol mono-alkyl ethers or acetates thereof, and diethylene glycol mono-alkyl ethers, and in some cases, nonpolar solvents such as toluene and xylene, and the like. These solvents may be used singly or as a mixture thereof. Among these, solvents whose boiling points are in the temperature range of 100 to 180° C. are more preferably used singly or as a mixture thereof.

the general formula (1) shown above. The pigment composition according to the present invention is used for coatings, inks, toners and resin molded products, and includes a pigment and at least one azo compound represented by the general formula (1) as a pigment dispersant.

A pigment included in a pigment composition in the present invention includes monoazo-based pigments, disazo-based pigments and polyazo-based pigments. Among these, acetoacetanilide-based pigments represented by C. I. Pigment Yellow 74, 93, 128, 155, 175 and 180 are preferable because having high affinity for the pigment dispersant according to the present invention. Especially C. I. Pigment Yellow 155 represented by the following formula (6) is preferable because of a high dispersion effect by an azo compound represented by the general formula (1) shown above according to the present invention. These pigments may be used singly or as a mixture of two or more.

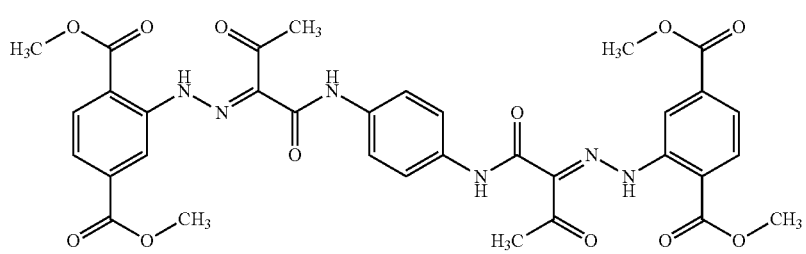

Formula (6)

A suitable polymerization temperature range varies depending on the kind of the radical polymerization reaction. Specifically, the polymerization is usually carried out in the temperature range of −30 to 200° C., and more preferably in the temperature range of 40 to 180° C.

An obtained polymer can be subjected to a purification treatment as required. Specifically, methods can be used such as reprecipitation and column chromatography using silica gel.

Although examples of the polymerization method used in the case where the copolymer is a block copolymer include a living polymerization method utilizing cationic polymerization or anionic polymerization, the application of the living polymerization method is difficult in a system including an α-substituted acrylic acid as in the present invention. On the other hand, an example is known which utilizes an addition-cleavage type chain transfer agent (for example, 2,4-diphenyl-4-methyl-1-pentene (also referred to as α-methylstyrene dimmer. Hereinafter, abbreviated to "MSD") to synthesize a block copolymer including a polyacrylic acid segment (see Japanese Patent No. 4254292). Since the polymerization method of a block copolymer using MSD can easily be applied to a system including an α-substituted acrylic acid, the polymerization method can be used suitably in the present invention.

Then, the pigment dispersant and the pigment composition according to the present invention will be described. Since azo compounds represented by the general formula (1) shown above according to the present invention exhibits high affinity for azo pigments, especially acetoacetanilide-based pigments, and also high affinity for water-insoluble solvents, the azo compounds can be used singly or in combination of two or more as a pigment dispersant.

The pigment dispersant according to the present invention suffices as long as including an azo compound represented by As a pigment usable in the present invention, also pigments other than the above-mentioned yellow pigments are suitably used as long as having affinity for the pigment dispersant according to the present invention, and are not limited.

Examples thereof include azo pigments such as C. I. Pigment Orange 1, 5, 13, 15, 16, 34, 36, 38, 62, 64, 67, 72 and 74; C. I. Pigment Red 2, 3, 4, 5, 12, 16, 17, 23, 31, 32, 41, 47, 48, 48:1, 48:2, 53:1, 57:1, 112, 144, 146, 166, 170, 176, 185, 187, 208, 210, 220, 221, 238, 242, 245, 253, 258, 266 and 269; C. I. Pigment Violet 13, 25, 32 and 50; C. I. Pigment Blue 25 and 26; and C. I. Pigment Brown 23, 25 and 41.

These may be crude pigments, or may be prepared pigment compositions unless remarkably inhibiting the effect of the pigment dispersant according to the present invention.

The mass composition ratio of a pigment to a pigment dispersant in the pigment composition according to the present invention is preferably in the range of 100:1 to 100:100, and more preferably in the range of 100:10 to 100:50 from the viewpoint of the pigment dispersibility.

A pigment composition can be produced in a wet system or a dry system. Since the azo compound according to the present invention has a high affinity for water-insoluble solvents, the production in a wet system, which can simply produce homogeneous pigment compositions, is preferable. Specifically, a pigment composition can be obtained, for example, as follows. In a dispersion medium, a pigment dispersant, and a resin according to needs are dissolved, and a pigment powder is gradually added thereto under stirring to be sufficiently adapted to the dispersion medium. Further addition of a mechanical shearing force by a disperser, such as a kneader, a roll mill, a ball mill, a paint shaker, a dissolver, an attritor, a sand mill or a high-speed mill, can cause the pigment dispersant to be adsorbed on the surface of the pigment particles, and disperse the pigment into a stable and homogeneous fine particle form.

To the pigment composition according to the present invention, auxiliary agents may further be added during the production. The auxiliary agents are specifically, for example, surfactants, pigment and non-pigment dispersants, fillers, standardizers, resins, waxes, defoaming agents, antistatics, dustproof agents, extenders, shading coloring agents, preservatives, drying inhibitors, rheology control additives, humectants, antioxidants, UV absorbents, photostabilizers, and combinations thereof. The pigment dispersant according to the present invention may be beforehand added in production of a crude pigment.

Then, the pigment dispersion according to the present invention will be described. The pigment dispersion according to the present invention includes the pigment composition described above and a water-insoluble solvent. The pigment composition may be dispersed in the water-insoluble solvent, or each constituting component of the pigment composition may be dispersed in the water-insoluble solvent. Specifically, for example, a pigment dispersion can be obtained as follows. In a dispersion medium, a pigment dispersant and a resin are dissolved according to needs, and a pigment or a pigment composition powder is gradually added thereto under stirring to be sufficiently adapted to the dispersion medium. Further addition of a shearing force by a disperser, such as a ball mill, a paint shaker, a dissolver, an attritor, a sand mill or a high-speed mill, can disperse the pigment into a stable and homogeneous fine particle form.

A water-insoluble solvent usable for the pigment dispersion according to the present invention can be decided according to the purposes and applications of the pigment dispersion, and is not especially limited. Specific examples thereof include esters such as methyl acetate, ethyl acetate and propyl acetate, hydrocarbons such as hexane, octane, petroleum ether, cyclohexane, benzene, toluene and xylene, and halogenated hydrocarbons such as carbon tetrachloride, trichloroethylene and tetrabromoethane.

A water-insoluble solvent usable for the pigment dispersion according to the present invention may be a polymerizable monomer. Specific examples thereof include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile and acrylamide.

A resin dissolvable in a dispersion medium is determined according to the purpose and applications of the pigment composition, and is not especially limited. Specific examples thereof include polystyrene resins, styrene copolymers, polyacrylic acid resins, polymethacrylic acid resins, polyacrylate ester resins, polymethacrylate ester resins, acrylate ester copolymers, methacrylate ester copolymers, polyester resins, polyvinyl ether resins, polyvinyl alcohol resins and polyvinyl butyral resins. Additionally, polyurethane resins and polypeptide resins are included. These resins may be used as a mixture of two or more.

The pigment composition according to the present invention is suitable as a coloring agent for a toner including toner particles having a binder resin and the coloring agent. Use of the pigment composition according to the present invention, since the dispersibility of a pigment in toner particles is kept good, provides a toner having a good color tone.

A binder resin for a toner used in the present invention includes styrene-methacrylic acid copolymers, styrene-acrylic acid copolymers, polyester resins, epoxy resins and styrene-butadiene copolymers, which are generally used therefor. In a method of obtaining toner particles directly by a polymerization method, a monomer to form the toner particles is used. Preferably used monomers are, specifically, styrenic monomers such as styrene, α-methylstyrene, α-ethylstyrene, o-methylstyrene, m-methylstyrene, p-methylstyrene, o-ethylstyrene, m-ethylstyrene and p-ethylstyrene, methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile and methacrylic acid amide, acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile and acrylic acid amide, and olefinic monomers such as butadiene, isoprene and cyclohexene. These monomers are used singly, or suitably mixed and used so that the theoretical glass transition temperature (Tg) is in the range of 40 to 75° C. (see "Polymer Handbook", edited by J. Brandrup and E. H. Immergut, $3^{rd}$ edit., John Wiley & Sons, 1989, 209-277 (in US)). The case where the theoretical glass transition temperature is lower than 40° C. is liable to cause a problem with the preservation stability and durability of a toner; by contrast, the case of the temperature exceeding 75° C. decreases the transparency in the formation of full color images by a toner.

A binder resin in the toner according to the present invention can control the distribution in the toner of additives such as a coloring agent, a charge control agent and a wax, by using a nonpolar resin such as polystyrene and concurrently a polar resin such as a polyester resin or a polycarbonate resin together. For example, in the case where toner particles are produced directly by a suspension polymerization method or the like, the polar resin is added during the polymerization reaction from a dispersion step to a polymerization step. As a result, the polar resin concentration can be controlled so as to continuously vary from the toner particle surface to the center thereof, including formation of a thin layer of the polar resin on the toner particle surface. At this time, use of such a polar resin to interact with a coloring agent including the pigment composition according to the present invention and with a charge control agent can make the presence state of the coloring agent in the toner particle to be a desirable form.

Further in the present invention, in order to enhance the mechanical strength of toner particles, and control the molecular weights of molecules constituting the particles, a crosslinking agent may be used in the synthesis of a binder resin.

The crosslinking agent is preferably used in the range of 0.05 to 10 parts by mass, and more preferably in the range of 0.1 to 5 parts by mass with respect to 100 parts by mass of the monomer described above, from the viewpoint of the fixability and the offsetability resistance of a toner.

As a coloring agent for a toner used in the present invention, a pigment composition indicated in the present invention is invariably used, but the pigment described above and another coloring agent can be used concurrently unless inhibiting the dispersibility of the pigment composition according to the present invention.

A coloring agent usable concurrently includes well-known coloring agents such as compounds represented by condensed azo compounds, isoindolinone compounds, anthraquinone compounds, azo metal complexes, methyne compounds and aryl amide compounds.

Wax components usable in the present invention specifically include petroleum wax such as paraffin wax, microcrystalline wax and petrolactam, and derivatives thereof; montan wax and derivatives thereof; hydrocarbon waxes by a Fischer-Tropsch process and derivatives thereof; polyolefin waxes represented by polyethylene, and derivatives thereof; and natural waxes such as carnauba wax and candelilla wax, and derivatives thereof, and these derivatives include oxides, block copolymers with vinyl monomers and graft modified materials. Additionally, wax components include alcohols such as higher aliphatic alcohols, fatty acids such as stearic acid and palmitic acid, fatty acid amides, fatty acid esters, hardened castor oil and derivatives thereof, vegetable waxes and animal waxes. These may be used singly or concurrently.

In the toner according to the present invention, a charge control agent can be mixed as required. Thereby, an optimum triboelectric charge amount can be controlled according to a development system.

As the charge control agent, well-known ones can be utilized, and a charge control agent is especially preferable which enables a high speed of charging and stably maintains a constant amount of charge. Additionally, in the case where toner particles are produced by a direct polymerization method, a charge control agent is especially preferable which exhibits low polymerization inhibition and contains substantially no soluble material to an aqueous medium.

Examples of the charge control agent to control a toner to a negatively chargeable one include polymers or copolymers having a sulfonic acid group, a sulfonate salt group or a sulfonate ester group, salicylic acid derivatives and metal complexes thereof, monoazo metallic compounds, acetylacetone metallic compounds, aromatic oxycarboxylic acids, aromatic mono- and polycarboxylic acids and metal salts thereof, anhydrides thereof and esters thereof, phenol derivatives such as bisphenol, urea derivatives, metal-containing naphthoic acid-based compounds, boron compounds, quaternary ammonium salts, carixarene and resin-based charge control agents. Examples thereof to control a toner to a positively chargeable one include nigrosine and nigrosines modified with fatty acid metal salts or the like, guanidine compounds, imidazole compounds, tributylbenzylammonium-1-hydroxy-4-naphthosulfonate salts, quaternary ammonium salts such as tetrabutylammonium tetrafluoroborate, onium salts such as phosphonium salts being analogues thereof and lake pigments thereof, triphenylmethane dyes and lake pigments thereof (the laking agent includes phosphotungstic acid, phosphomolybdic acid, phosphotungstomolybdic acid, tannic acid, lauric acid, gallic acid, ferricyanides and ferrocyanides), metal salts of higher fatty acids, diorganotin oxides such as dibutyltin oxide, dioctyltin oxide and dicyclohexyltin oxide, diorganotin borates such as dibutyltin borate, dioctyltin borate and dicyclohexyltin borate, and resin-based charge control agents. These may be used singly or in combinations of two or more.

In the toner according to the present invention, an inorganic fine powder may be added as a fluidizing agent to the toner particles. The inorganic fine powders usable are fine powders of silica, titanium oxide, alumina and double oxides thereof, surface-treated materials thereof, and the like.

It does not matter whatever approach is used for production of the toner particles according to the present invention, but the means specifically includes a pulverization method, a suspension polymerization method and a suspension granulation method. Among these production methods, production methods are especially preferable which granulate in an aqueous medium, such as a suspension polymerization method and a suspension granulation method. In the case of toner particles by a common pulverization method, addition of a large amount of a wax component to the toner particles causes a very high technical difficulty level in developability. By granulating toner particles in an aqueous medium, even if a wax component is used in a large amount, means can be adopted by which the wax component is not allowed to be present on the toner particle surface. Further by precisely controlling the particle shape of toner particles, since each toner particle is caused to include the same amount of a coloring agent, the influence of the coloring agent on charging characteristics becomes uniform, thereby improving the developability and the transferability well balancedly.

Toner particles produced by a suspension polymerization method can be produced, for example, by the following steps. First, a coloring agent including the pigment composition according to the present invention, a binder resin, a wax component, a polymerization initiator and the like are mixed to prepare a polymerizable monomer composition. Then, the polymerizable monomer composition is dispersed in an aqueous medium to granulate particles of the polymerizable monomer composition. Then, polymerizable monomers in the particles of the polymerizable monomer composition are polymerized in an aqueous medium to obtain toner particles.

The polymerizable monomer composition in the step described above is preferably prepared by mixing a dispersion liquid in which the coloring agent is dispersed in a first polymerizable monomer, with a second polymerizable monomer. That is, after the coloring agent including the pigment composition according to the present invention is fully dispersed in the first polymerizable monomer, the dispersion liquid is mixed with the second polymerizable monomer together with other toner materials, whereby the toner particles are obtained in which a pigment is present in a better dispersion state.

A polymerization initiator used in the suspension polymerization method includes well-known polymerization initiators. Specific examples thereof include azo-based compounds such as 2,2-azobisisobutyronitrile, 2,2-azobis(2,4-dimethylvaleronitrile), 2,2-azobis(2-methylbutyronitrile), 1,1-azobis(cyclohexane-1-carbonitrile), dimethyl-2,2-azobisisobutyrate, 4,4-azobis-4-cyanovaleronitrile and 2,2-azobis (4-methoxy-2,4-dimethylvaleronitrile), and peroxides such as benzoyl peroxide, methyl ethyl ketone peroxide, diisopropyl peroxycarbonate, cumene hydroperoxide, 2,4-dichlorobenzoyl peroxide, lauroyl peroxide and tert-butyl-peroxypivalate. The use amount of a polymerization initiator, depending on the target polymerization degree, is preferably in the range of 0.1 to 20 parts by mass, and more preferably in the range of 0.1 to 10 parts by mass, with respect to 100 parts by mass of a polymerizable monomer. The kind of a polymerization initiator slightly differs depending on the polymerization method, but the polymerization initiator is used singly or as a mixture thereof with reference to the 10-hour half-life temperature.

An aqueous medium used in the suspension polymerization method preferably includes a dispersion stabilizer. As the dispersion stabilizer, well-known inorganic and organic dispersants can be used.

In the present invention, among the dispersants described above, a hardly water-soluble inorganic dispersant soluble to acids is preferably used. Further in the present invention, in the case where an aqueous medium is prepared using the hardly water-soluble inorganic dispersant, the dispersant is used in a proportion in the range of 0.2 to 2.0 parts by mass with respect to 100 parts by mass of a polymerizable monomer preferably from the viewpoint of the liquid droplet stability in the aqueous medium of the polymerizable monomer composition. Still further in the present invention, an aqueous medium is preferably prepared using water in the range of 300 to 3,000 parts by mass with respect to 100 parts by mass of the polymerizable monomer composition.

Also in the case where the toner particles according to the present invention are produced by a suspension granulation method, suitable toner particles can be obtained. Since the production step of the suspension granulation method has no heating step, the compatibilization of a resin with a wax component, which is caused in the case of using a low-melting point wax, is suppressed and a decrease in the glass transition temperature of the toner due to the compatibilization can be prevented. Additionally, since the suspension granulation method has a broad selection of a toner material to become a binder resin, the method can easily adopt a polyester resin, which is considered to be generally advantageous in fixability, as a main component.

Toner particles produced by a suspension granulation method can be produced, for example, by the following steps. First, a coloring agent including the pigment composition according to the present invention, a binder resin, a wax component, and the like are mixed in a solvent to prepare a solvent composition. Then, the solvent composition is dispersed in an aqueous medium to granulate particles of the solvent composition to obtain a toner particle suspension liquid. Then, the suspension liquid is heated or depressurized to remove the solvent to obtain toner particles.

The solvent composition in the step described above is preferably prepared by mixing a dispersion liquid in which the coloring agent is dispersed in a first solvent, with a second solvent. That is, after the coloring agent including the pigment composition according to the present invention is fully dispersed in the first solvent, the dispersion liquid is mixed with the second solvent together with other toner materials, whereby the toner particles are obtained in which a pigment is present in a better dispersion state.

Examples of a solvent usable in the suspension granulation method include hydrocarbons such as toluene, xylene and hexane, halogenated hydrocarbons such as methylene chloride, chloroform, dichloroethane, trichloroethane and carbon tetrachloride, alcohols such as methanol, ethanol, butanol and isopropyl alcohol, polyhydric alcohols such as ethylene glycol, propylene glycol, diethylene glycol and triethylene glycol, cellosolves such as methyl cellosolve and ethyl cellosolve, ketones such as acetone, methyl ethyl ketone and methyl isobutyl ketone, ethers such as benzyl alcohol ethyl ether, benzyl alcohol isopropyl ether and tetrahydrofuran, and esters such as methyl acetate, ethyl acetate, and butyl acetate. These may be used singly or as a mixture of two or more. Among these, in order to easily remove a solvent in the toner particle suspension liquid, the solvent is preferably used which has a low boiling point and can sufficiently dissolve the binder resin.

The use amount of the solvent is preferably in the range of 50 to 5,000 parts by mass, and more preferably in the range of 120 to 1,000 parts by mass, with respect to 100 parts by mass of a binder resin.

An aqueous medium used in the suspension granulation method preferably includes a dispersion stabilizer. As the dispersion stabilizer, the same dispersion stabilizer as in the suspension polymerization can be used.

The use amount of the dispersant described above is preferably in the range of 0.01 to 20 parts by mass with respect to 100 parts by mass of a binder resin from the viewpoint of the liquid droplet stability of the solvent composition in an aqueous medium.

In the present invention, the toner preferably has a weight-average particle diameter (hereinafter, D4) of 3.00 to 15.0 μm, and more preferably 4.00 to 12.0 μm.

The ratio (hereinafter, D4/D1) of D4 to the number-average particle diameter (hereinafter, D1) of the toner is 1.35 or less, and preferably 1.30 or less. If D4/D1 is 1.35 or less, the occurrence of fogging and a decrease in the transferability can be suppressed well.

The regulation method of D4 and D1 of the toner according to the present invention varies depending on the production method of the toner particles. For example, in the case of the suspension polymerization method, D4 and D1 can be regulated by controlling the concentration of a dispersion stabilizer used in the preparation of an aqueous medium, the stirring speed in the reaction, the stirring time in the reaction and the like.

The toner according to the present invention may be either of a magnetic one and a nonmagnetic one. In the case of using the toner as a magnetic one, the toner particles constituting the toner according to the present invention may use a mixed magnetic material. Such a magnetic material includes iron oxides such as magnetite, maghemite and ferrite, iron oxides including other metal oxides, metals such as Fe, Co and Ni, alloys of these metals with a metal such as Al, Co, Cu, Pb, Mg, Ni, Sn, Zn, Sb, Be, Bi, Cd, Ca, Mn, Se, Ti, W and V, and mixtures thereof.

EXAMPLES

Then, the present invention will be described more specifically by way of Examples, but the scope of the present invention is not limited thereto. Provided that "parts" and "%" in the description are in terms of mass unless otherwise specified.

Measurement methods used in Examples will be described hereinafter.

(1) Measurement of a Molecular Weight

The molecular weights of a polymer site and an azo compound in the present invention were calculated by a size-exclusion chromatography (SEC) in terms of polystyrene. The molecular weight by SEC was measured as follows.

A solution, obtained by adding a sample to an eluate described below so that the sample concentration was 1.0% by mass, and leaving the solution at rest at room temperature for 24 hours, was filtered with a solvent-resistive membrane filter having a pore diameter of 0.2 μm to make a sample solution, which was measured by the following conditions.

Apparatus: a high-performance GPC apparatus (HLC-8220GPC)[made by Tosoh Corp.]
Column: two series of TSKgel α-M [made by Tosoh Corp.]
Eluate: DMF (containing 20 mM LiBr)
Flow rate: 1.0 ml/min
Oven temperature: 40° C.
Sample injection amount: 0.10 ml For the calculation of the molecular weight of a sample, a molecular weight calibration curve fabricated using standard polystyrene resins [TSK standard polystyrenes: F-850, F-450, F-288, F-128, F-80, F-40, F-20, F-10, F-4, F-2, F-1, A-5000, A-2500, A-1000 and A-500] was used.

(2) Measurement of an Acid Value

The acid values of a polymer site and an azo compound in the present invention were determined by the following method.

The basic operation was according to JIS K-0070.
1) 0.5 to 2.0 g of a sample was precisely weighed. The mass at this time was taken as W (g).
2) The sample was put in a 300-ml beaker, and 150 ml of a mixed liquid of toluene/ethanol (4/1) was added to dissolve the sample.
3) The titration was carried out using a 0.1-mol/1-KOH ethanol solution and using a potentiometric titrator (for example, an automatic titrator COM-2500 made by Hiranuma Sangyo Corp. could be utilized.)
4) The use amount of the KOH solution at this time was taken as S (ml). The blank value was measured simultaneously, and the use amount of the KOH solution at this time was taken as B (ml).
5) The acid value was calculated by the following expression. f was a factor of the KOH solution. Acid value (mgKOH/g)=$\{(S-B) \times f \times 5.61\}/W$ (3) Compositional Analysis The determination of the structures of a polymer site and an azo compound in the present invention was carried out using the following apparatus.

The compositional analysis used a FT-NMR AVANCE-600 (solvent used: heavy chloroform) made by Bruker Biospin GmbH, and was carried out by quantification by the inverse gated decoupling method, in which $^{13}$C-NMR used chromium (III) acetylacetonate as a relaxation reagent.

Polymer sites including partial structural formulae represented by the general formulae (3) to (5) shown above were synthesized according to the following method.

Synthesis Example 1

For a Copolymer: Synthesis of Resin A 100 parts of propylene glycol monomethyl ether was heated under nitrogen replacement, and refluxed at a liquid temperature of 120° C. or higher. A mixture of 152 parts of styrene, 38 parts of butyl acrylate, 10 parts of acrylic acid, and 1.0 part of tert-butylperoxybenzoate [an organic peroxide-based polymerization initiator, trade name: Perbutyl Z, made by NOF Corp.) was dropped thereto over 3 hours. After the completion of the dropping, the solution was stirred for 3 hours, and thereafter, while the solution temperature was being raised to 170° C., the solution was subjected to a normal-pressure distillation. After the solution temperature reached 170° C., the solution was depressurized to 1 hPa, and vaporized for 1 hour to remove the solvent, to obtain a resin solid material. The resin solid material was dissolved in tetrahydrofuran, and reprecipitated with n-hexane, and a deposited solid was filtered off to obtain Resin A.
[Analysis Results of Resin A]
[1] The result by GPC: the number-average molecular weight (Mn)=19,530
[2] The data analysis result of $^{13}$C-NMR (600 MHz, CDCl$_3$, room temperature): as a result of quantification of the numbers of carbon atoms constituting the copolymer assigned to each peak, the molar ratio of respective partial structural formulae represented by the general formulae (3) to (5) constituting Resin A was the general formula (3)/the general formula (4)/the general formula (5)=6/78/16.
[3] The measurement result of the acid value: 36 mgKOH/g The measurement result of the number-average molecular weight and the molar ratio of the respective partial structural formulae revealed that the repeating numbers l, m and n of the partial structural formulae represented by the general formulae (3) to (5) in Resin A are l/m/n=11/143/30 in average.

Synthesis Example 2

For a Copolymer: Synthesis of Resin B 100 parts of propylene glycol monomethyl ether was heated under nitrogen replacement, and refluxed at a liquid temperature of 120° C. or higher. A mixture of 5 parts of acrylic acid, 6 parts of MSD, and 0.1 part of tert-butylperoxybenzoate [an organic peroxide polymerization initiator, trade name: Perbutyl Z, made by NOF Corp.) was dropped thereto over 3 hours. After the completion of the dropping, the solution was stirred for 3 hours, and thereafter, the solution temperature was cooled to room temperature to obtain a resin solution.

Then, 300 parts of propylene glycol monomethyl ether was added to the resin solution, and heated and refluxed at a solution temperature of 120° C. or higher under nitrogen replacement. A mixture of 76 parts of styrene, 19 parts of butyl acrylate, and 6.7 parts of tert-butylperoxybenzoate [an organic peroxide polymerization initiator, trade name: Perbutyl Z, made by NOF Corp.) was dropped to the solution over 3 hours. After the completion of the dropping, the solution was stirred for 3 hours, and thereafter, while the solution temperature was being raised to 170° C., the solution was subjected to a normal-pressure distillation. After the solution temperature reached 170° C., the solution was depressurized to 1 hPa, and vaporized for 1 hour to remove the solvent, to obtain a resin solid material. The resin solid material was dissolved in tetrahydrofuran, and reprecipitated with n-hexane, and a deposited solid was filtered off to obtain Resin B.
[Analysis results of Resin B]
[1] The result by GPC: the number-average molecular weight (Mn)=9,775
[2] The data analysis result of $^{13}$C-NMR (600 MHz, CDCl$_3$, room temperature): as a result of quantification of the numbers of carbon atoms constituting the copolymer assigned to each peak, the molar ratio of respective partial structural formulae represented by the general formulae (3) to (5) constituting Resin B was the general formula (3)/the general formula (4)/the general formula (5)=2/82/16.
[3] The measurement result of the acid value: 23 mgKOH/g The measurement result of the number-average molecular weight and the molar ratio of the respective partial structural formulae revealed that the repeating numbers l, m and n of the partial structural formulae represented by the general formulae (3) to (5) in Resin B were l/m/n=2/75/15 in average.

Resins C to I shown in the following Table 1 were synthesized by the similar operations as in Synthesis Examples of Resin A and Resin B as described above.

TABLE 1

SYNTHESIS EXAMPLES OF RESINS

| Resin | $R_{16}$ | $R_{17}$ | $R_{18}$ | $R_{19}$ | l | m | n | Stereo-regularity (Arrangement of Partial Structural Formulae) |
|---|---|---|---|---|---|---|---|---|
| Resin A | H | H | $C_4H_9$ | H | 11 | 143 | 30 | Random |
| Resin B | H | H | $C_4H_9$ | H | 2 | 75 | 15 | Block |
| Resin C | H | None | None | H | 11 | 228 | 0 | Random |
| Resin D | H | None | None | H | 5 | 85 | 0 | Block |
| Resin E | None | H | $C_4H_9$ | H | 10 | 0 | 91 | Random |
| Resin F | H | H | $C_4H_9$ | H | 5 | 9 | 10 | Random |
| Resin G | H | None | None | Me | 579 | 1177 | 0 | Random |
| Resin H | Me | Me | Me | H | 5 | 15 | 12 | Random |
| Resin I | Me | Me | Bn | H | 4 | 16 | 12 | Random |

In Table 1, "Me" denotes a methyl group, and "Bn" denotes a benzyl group. "Random" denotes a copolymer in which the arrangement of the partial structural formulae represented by the general formulae (3) to (5) shown above are random; and "block" denotes a block copolymer of a segment of the partial structural formula represented by the general formula (3) and a segment of the partial structural formulae represented by the general formulae (4) and (5).

Example 1

Then, an azo compound represented by the general formula (1) shown above according to the present invention which acts as a pigment dispersant was synthesized according to the following method.

Synthesis Example 1

For an Azo Compound: Synthesis of an Azo Compound (27)

An azo compound (27), in which in the general formula (1), $R_2$, $R_3$, $R_5$, $R_6$, $R_8$, $R_9$ and $R_{11}$ were each a hydrogen atom; there was a bond with Resin A described above at $R_4$; $R_7$ and $R_{10}$ were each a $COOCH_3$ group; $R_1$ was a methyl group; and k=6, and l=5, was synthesized according to the following scheme.

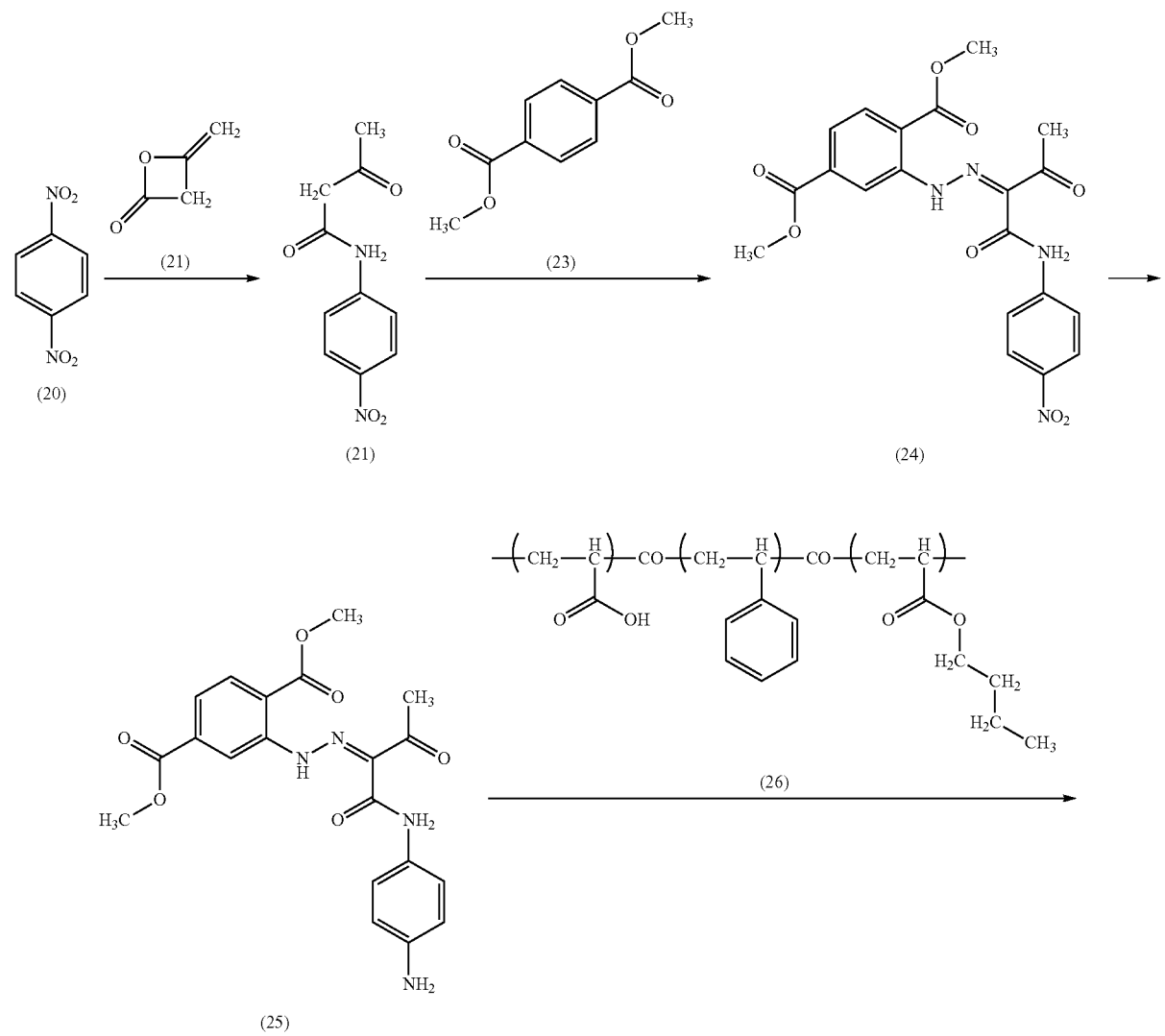

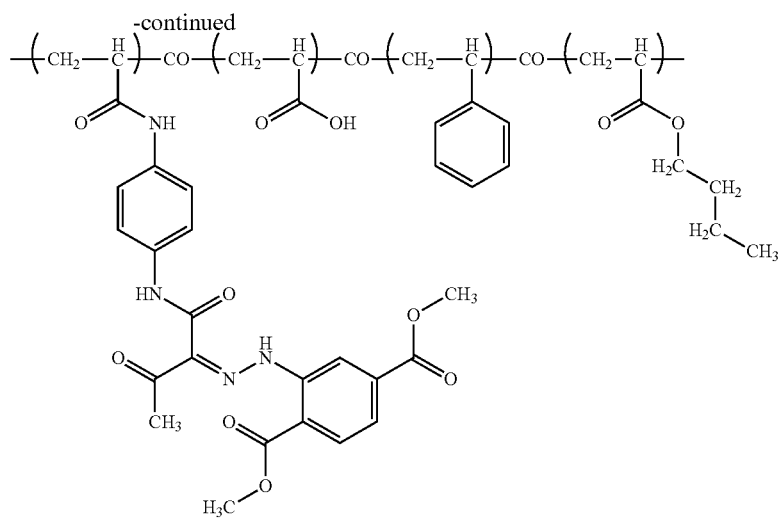

(27)

wherein "co" is a symbol denoting that the arrangement of each partial structural formula constituting the copolymer is random.

First, a compound (22) was synthesized using compounds (20) and (21). 3.11 parts of the compound (20) was added to 30 parts of chloroform, and ice-cooled to 10° C. or lower, and 1.89 parts of the compound (21) was added thereto. Thereafter, the mixture was stirred at 65° C. for 2 hours. After the completion of the reaction, 4.80 parts of the compound (22) was obtained (yield: 96.0%) by extraction with chloroform and concentration.

Next, a compound (24) was synthesized using the compound (22) and a compound (23). 40.0 parts of methanol and 5.29 parts of concentrated hydrochloric acid were added to 4.25 parts of the compound (23), and ice-cooled to 10° C. or lower. To the solution, a solution in which 2.10 parts of sodium nitrite was dissolved in 6.00 parts of water was added, and allowed to react at the same temperature for 1 hour. Then, 0.990 part of sulfamic acid was added and stirred further for 20 min (diazonium salt solution). 70.0 parts of methanol and 4.51 parts of the compound (22) were added, and ice-cooled to 10° C. or lower; and the diazonium salt solution was added. Thereafter, a solution in which 5.83 parts of sodium acetate was dissolved in 7.00 parts of water was added, and allowed to react at 10° C. or lower for 2 hours. After the completion of the reaction, 300 parts of water was added and stirred for 30 min; thereafter, a solid was filtered off; and 8.65 parts of the compound (24) was obtained (yield: 96.1%) by purification by the recrystallization method from N,N-dimethylformamide.

Then, a compound (25) was synthesized using the compound (24). 8.58 parts of the compound (24) and 0.4 part of palladium-active carbon (palladium: 5%) were added to 150 parts of N,N-dimethylformamide, and stirred in a hydrogen gas atmosphere (reaction pressure: 0.1 to 0.4 MPa) at 40° C. for 3 hours. After the completion of the reaction, 7.00 parts of the compound (25) was obtained (yield: 87.5%) by filtration and concentration of the solution.

Then, an azo compound (27) was synthesized using the compound (25) and Resin A (26). 1.98 parts of the compound (25) was added to 500 parts of dehydrated tetrahydrofuran, and heated to 80° C. to be dissolved. After the dissolution, the solution was cooled to 50° C.; 15 parts of Resin A (26) was added and dissolved; 1.96 parts of 1-ethyl-3-(3-dimethylaminopropyl)carbodiimide hydrochloride (EDC.HCl) was added and stirred at 50° C. for 5 hours; and thereafter, the solution temperature was gradually returned to room temperature, and stirred over a night to complete the reaction. After the completion of the reaction, the azo compound (27) was obtained by filtration and concentration of the solution, and purification by reprecipitation with methanol.

[Analysis Results of the Azo Compound (27)]
[1] The result by GPC: the number-average molecular weight (Mn)=21,998
[2] The result of $^{13}$C-NMR (600 MHz, CDCl$_3$, room temperature) (see FIG. 1): δ [ppm]=199.88, 178.45, 175.41, 172.96, 165.89, 165.52, 160.684, 154.34, 143.48, 134.93, 134.02, 132.86, 131.48, 127.67, 125.54, 120.64, 118.49, 116.52, 63.36, 52.66, 52.44, 40.58, 34.95, 30.08, 26.26, 18.66, 14.32, 13.39
[3] The measurement result of the acid value: 7.3 mgKOH/g As a result of calculation of average values of k and l in the general formulae (2) and (3) in the azo compound (27) from the number-average molecular weight and the compositional analysis result by $^{13}$C-NMR, k was 6 and l was 5.

Synthesis Example 2

For an Azo Compound: Synthesis of an Azo Compound (30)

An azo compound (30) was obtained as in Synthesis Example 1 of an azo compound described above, except for altering Resin A in the Synthesis Example 1 to Resin B.

Figure 2:
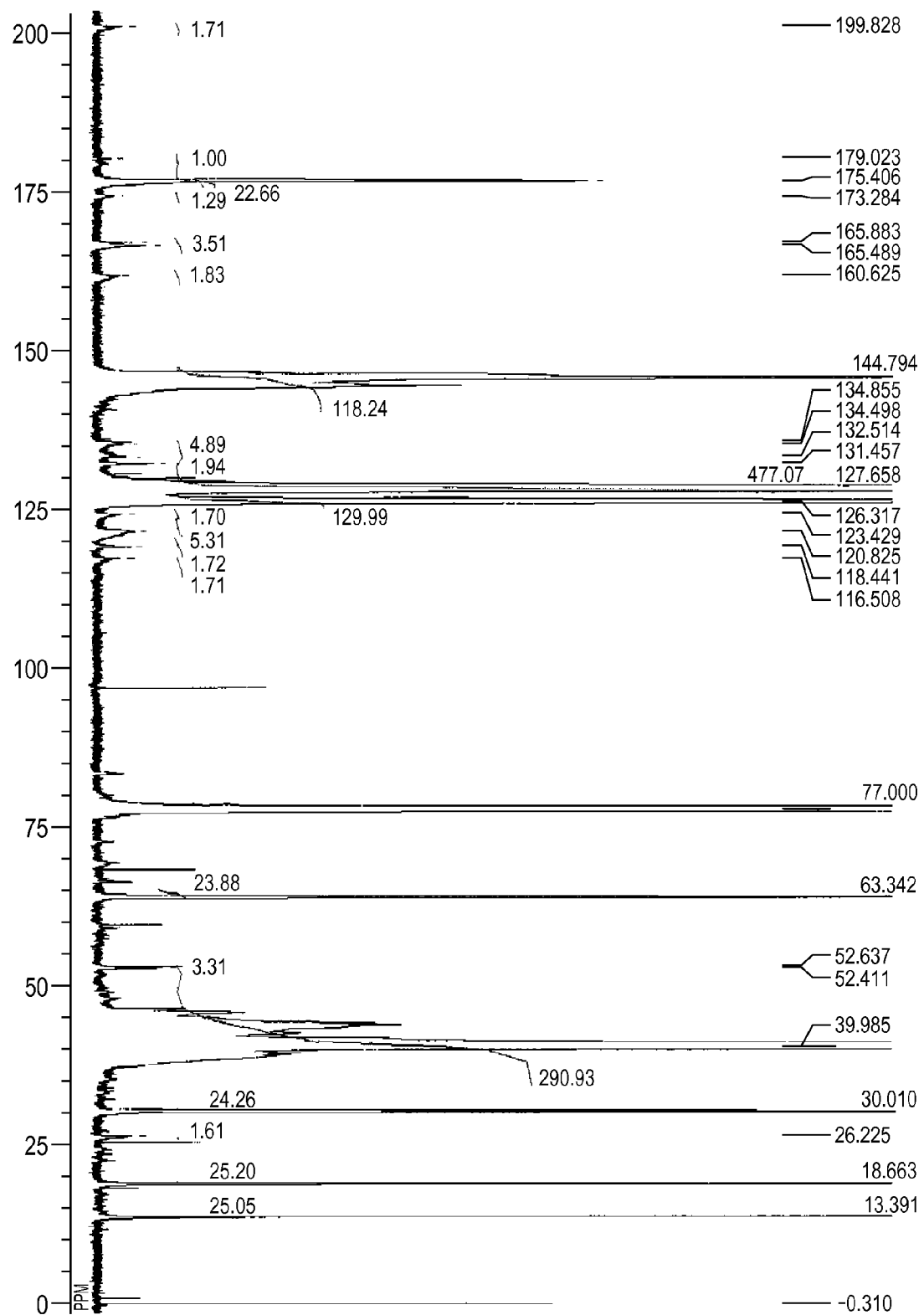
FIG. 2 is a $^{13}$C-NMR spectrum diagram of the azo compound (30) according to the present invention.

[Analysis Results of the Azo Compound (30)]
[1] The result by GPC: the number-average molecular weight (Mn)=10,229
[2] The result of $^{13}$C-NMR (600 MHz, CDCl$_3$, room temperature)(see FIG. 2): δ [ppm]=199.83, 179.02, 175.41, 173.28, 165.88, 165.49, 160.63, 144.79, 134.86, 134.50, 132.51, 131.46, 127.66, 125.32, 123.43, 120.83, 118.44, 116.51, 63.34, 52.64, 52.41, 39.99, 30.01, 26.23, 18.66, 13.39
[3] The measurement result of the acid value: 2.1 mgKOH/g As a result of calculation of average values of k and l in the general formulae (2) and (3) in the azo compound (30) from the number-average molecular weight and the compositional analysis result by $^{13}$C-NMR, k was 1 and l was 1. $R_{15}$ in the partial structural formula represented by the general formula (2) was a hydrogen atom.

Synthesis Example 3

For an Azo Compound: Synthesis if an Azo Compound (31)

An azo compound (31) was obtained as in Synthesis Example 1 of an azo compound described above, except for altering Resin A in the Synthesis Example 1 to Resin C.

[Analysis Results of the Azo Compound (31)]

[1] The result by GPC: the number-average molecular weight (Mn)=27,485

Figure 3:
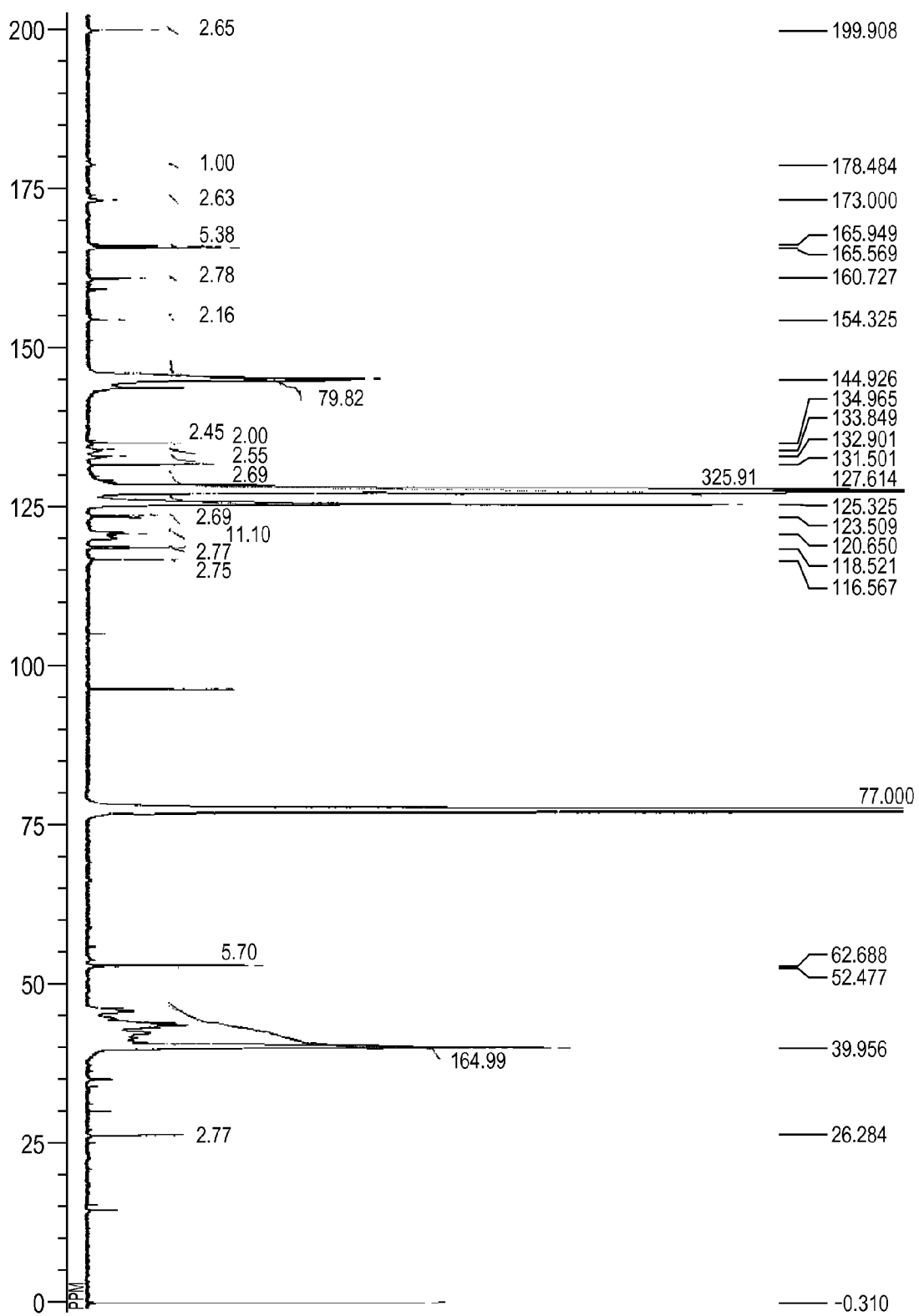
FIG. 3 is a $^{13}$C-NMR spectrum diagram of the azo compound (31) according to the present invention.

[2] The result of $^{13}$C-NMR (600 MHz, CDCl$_3$, room temperature)(see FIG. 3): δ [ppm]=199.91, 178.48, 173.00, 165.95, 165.57, 160.73, 154.33, 144.93, 134.96, 133.85, 132.90, 131.50, 127.61, 125.32, 123.51, 120.65, 118.52, 116.57, 52.69, 52.48, 39.96, 26.28

[3] The measurement result of the acid value: 9.2 mgKOH/g

As a result of calculation of average values of k and l in the general formulae (2) and (3) in the azo compound (31) from the number-average molecular weight and the compositional analysis result by $^{13}$C-NMR, k was 8 and l was 3. $R_{15}$ in the partial structural formula represented by the general formula (2) was a hydrogen atom.

The similar operations as in Synthesis Examples 1 to 3 described above were carried out to synthesize azo compounds (28) and (29), and (32) to (54). A list of these azo compounds is shown in the following Table 2. $R_{15}$ in the partial structural formula represented by the general formula (2) was the same as $R_{19}$ in the resin used correspondingly.

TABLE 2

| Compound No. | $R_1$ | $R_2$ | $R_3$ | $R_4$ | $R_5$ | $R_6$ | $R_7$ | $R_8$ | $R_9$ | $R_{10}$ | $R_{11}$ | Average Repeating Number of the Partial Structural Formula k | l |
|---|---|---|---|---|---|---|---|---|---|---|---|---|---|
| (27) | Me | H | H | Resin A | H | H | COOCH$_3$ | H | H | COOCH$_3$ | H | 6 | 5 |
| (28) | Me | H | H | Resin A | H | H | COOCH$_3$ | H | H | COOCH$_3$ | H | 1 | 10 |
| (29) | Me | H | H | Resin A | H | H | COOCH$_3$ | H | H | COOCH$_3$ | H | 11 | 0 |
| (30) | Me | H | H | Resin B | H | H | COOCH$_3$ | H | H | COOCH$_3$ | H | 1 | 1 |
| (31) | Me | H | H | Resin C | H | H | COOCH$_3$ | H | H | COOCH$_3$ | H | 8 | 3 |
| (32) | Me | H | H | Resin D | H | H | COOCH$_3$ | H | H | COOCH$_3$ | H | 5 | 0 |
| (33) | Me | H | H | Resin E | H | H | COOCH$_3$ | H | H | COOCH$_3$ | H | 8 | 2 |
| (34) | Me | H | H | Resin F | H | H | COOCH$_3$ | H | H | COOCH$_3$ | H | 2 | 3 |
| (35) | Me | H | H | Resin G | H | H | COOCH$_3$ | H | H | COOCH$_3$ | H | 197 | 382 |
| (36) | Me | H | H | Resin H | H | H | COOCH$_3$ | H | H | COOCH$_3$ | H | 5 | 0 |
| (37) | Me | H | H | Resin I | H | H | COOCH$_3$ | H | H | COOCH$_3$ | H | 4 | 0 |
| (38) | Me | H | Resin A | H | H | H | COOCH$_3$ | H | H | COOCH$_3$ | H | 6 | 5 |
| (39) | Me | Resin A | H | H | H | H | COOCH$_3$ | H | H | COOCH$_3$ | H | 4 | 7 |
| (40) | C$_6$H$_{13}$ | H | H | Resin A | H | H | COOCH$_3$ | H | H | COOCH$_3$ | H | 6 | 5 |
| (41) | Ph | H | H | Resin A | H | H | COOCH$_3$ | H | H | COOCH$_3$ | H | 6 | 5 |
| (42) | Me | H | H | Resin A | H | H | COOH | H | H | COOH | H | 4 | 7 |
| (43) | Me | H | H | Resin A | H | H | COOC$_2$H$_5$ | H | H | COOC$_2$H$_5$ | H | 6 | 5 |
| (44) | Me | H | H | Resin A | H | H | COOC$_3$H$_7$ | H | H | COOC$_3$H$_7$ | H | 6 | 5 |
| (45) | Me | H | H | Resin A | H | H | CONH$_2$ | H | H | CONH$_2$ | H | 5 | 6 |
| (46) | Me | H | H | Resin A | H | H | CONHCH$_3$ | H | H | CONHCH$_3$ | H | 6 | 5 |
| (47) | Me | H | H | Resin A | H | H | CONHC$_2$H$_5$ | H | H | CONHC$_2$H$_5$ | H | 6 | 5 |
| (48) | Me | H | H | Resin A | H | H | CONHC$_3$H$_7$ | H | H | CONHC$_3$H$_7$ | H | 7 | 4 |
| (49) | Me | H | H | Resin A | H | H | CON(CH$_3$)$_2$ | H | H | CON(CH$_3$)$_2$ | H | 6 | 5 |
| (50) | Me | H | H | Resin A | H | H | H | H | H | H | COOCH$_3$ | 6 | 5 |
| (51) | Me | H | H | Resin A | H | H | H | COOCH$_3$ | H | H | H | 6 | 5 |
| (52) | Me | H | H | Resin A | H | H | H | H | COOCH$_3$ | H | H | 6 | 5 |
| (53) | Me | H | H | Resin A | H | H | H | COOCH$_3$ | H | COOCH$_3$ | H | 6 | 5 |
| (54) | Me | H | Resin A | Resin A | H | H | COOCH$_3$ | H | H | COOCH$_3$ | H | 3 | 8 |

In Table 2, "Me" denotes a methyl group.

As Comparative Examples for azo compounds represented by the general formula (1) according to the present invention, the following comparative azo compounds (55) to (57) were synthesized according to the production method described above.

A comparative azo compound represented by the following formula (55) was synthesized by altering the colorant site of the azo compound (27) according to the present invention to a colorant site exemplified in Japanese Patent No. 3984840.

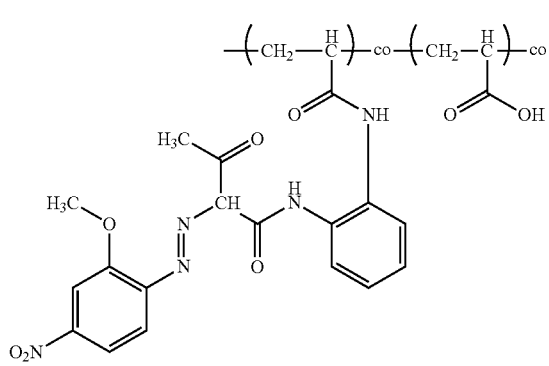
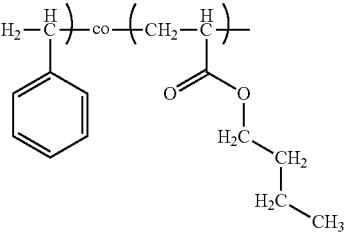

Comparative azo compound (55)

wherein "co" is a symbol denoting that the arrangement of each partial structural formula constituting the copolymer is random.

A following comparative azo compound (56) in which Resin A according to the present invention was bonded at $R_1$ position in the general formula (1) shown above, and a following comparative azo compound (57) in which Resin A according to the present invention was bonded at $R_9$ position therein were similarly synthesized.

Comparative azo compound (56)

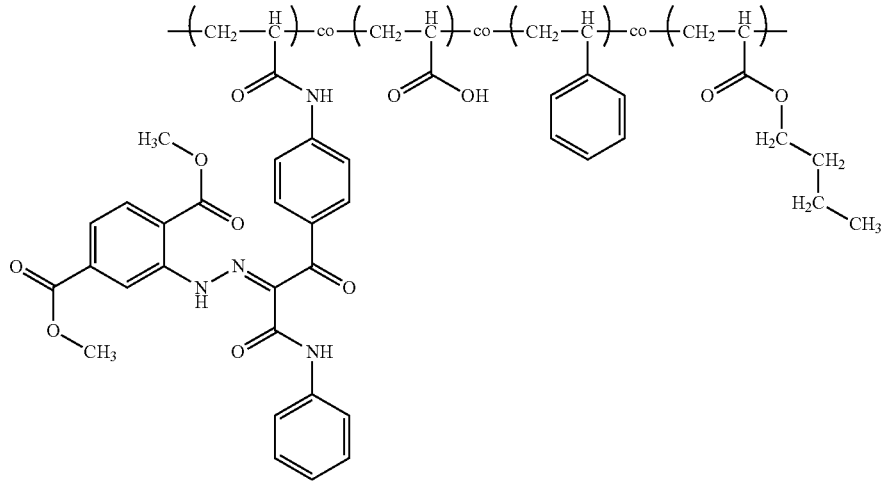

wherein "co" is a symbol denoting that the arrangement of each partial structural formula constituting the copolymer is random.

Comparative azo compound (57)

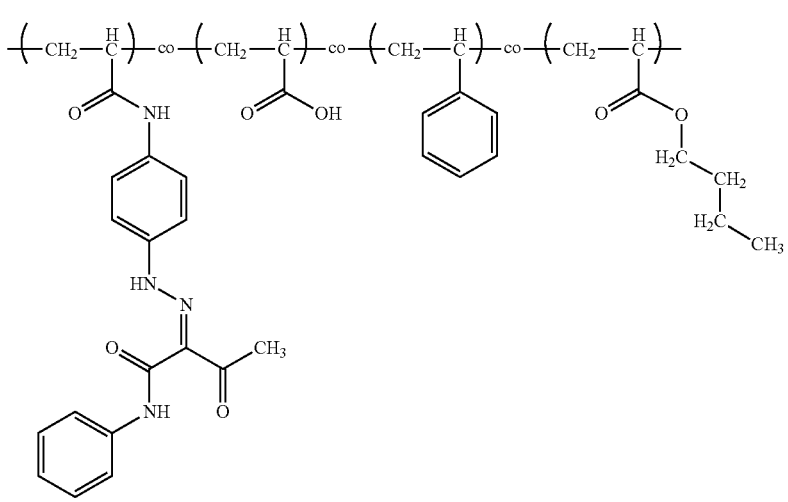

wherein "co" is a symbol denoting that the arrangement of each partial structural formula constituting the copolymer is random.

Example 2

The pigment dispersion according to the present invention was prepared by the following method.

Preparation Example 1

For a Pigment Dispersion

| | |
|---|---|
| Styrene | 180.0 parts |
| A coloring agent of the formula (6) | 18.0 parts |

Formula (6)

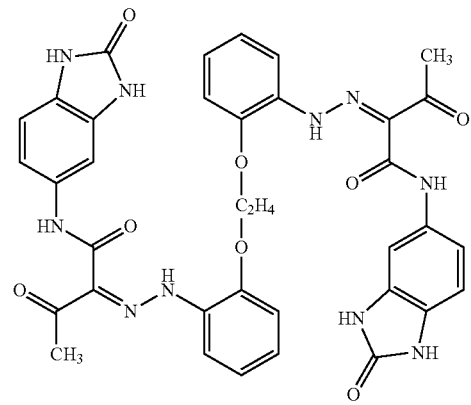

| | |
|---|---|
| The azo compound (27) | 3.6 parts |

A pigment dispersion (1) was obtained by dispersing the materials described above for 3 hours with an attritor (made by Nippon Coke & Engineering Co., Ltd.).

Preparation Examples 2 to 28

For Pigment Dispersions

Pigment dispersions (2) to (28) were obtained by the similar operations as in Preparation Example 1 of a pigment dispersion described above, except for altering the azo compound (27) in Preparation Example 1 to azo compounds (28) to (54), respectively.

Preparation Example 29

For a Pigment Dispersion>

A pigment dispersion (29) was obtained by the similar operations as in Preparation Example 1 of a pigment dispersion described above, except for altering the azo compound (27) in Preparation Example 1 to an azo compound (33), and altering styrene therein to n-butyl acrylate.

Preparation Example 30

For a Pigment Dispersion

A pigment dispersion (30) was obtained by the similar operations as in Preparation Example 1 of a pigment dispersion described above, except for altering styrene therein to toluene.

Preparation Examples 31 to 33

For Pigment Dispersions

Pigment dispersions (31) to (33) were obtained by the similar operations as in Preparation Example 1 of a pigment dispersion described above, except for altering the pigment represented by the formula (6) shown above in the Preparation Example 1 to pigments represented by the following formulae (58) to (60), respectively.

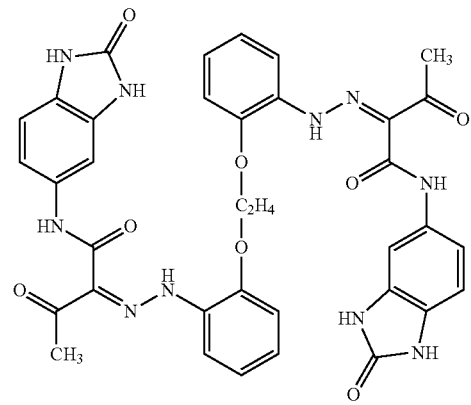

(58)

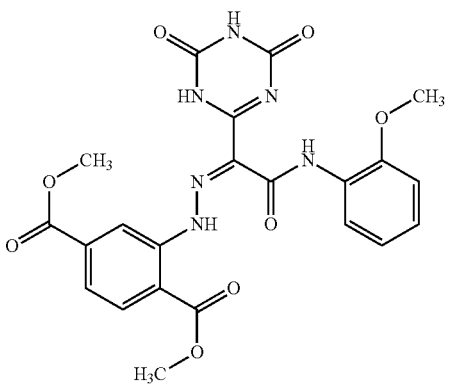

(59)

(60)

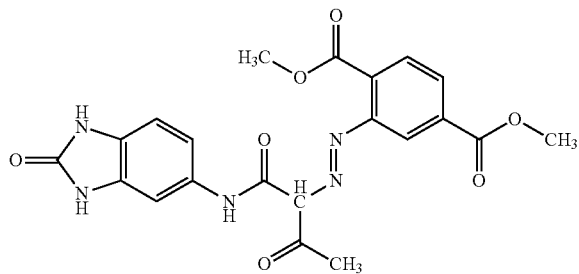

Preparation Example 1

For a Referential Pigment Dispersion

A referential pigment dispersion (34) was obtained by the similar operations as in Preparation Example 1 of the pigment dispersion described above, except for adding no azo compound (27).

Preparation Example 2

For a Referential Pigment Dispersion

A referential pigment dispersion (35) was obtained by the similar operations as in Preparation Example 29 of the pigment dispersion described above, except for adding no azo compound (33).

Preparation Example 3

For a Referential Pigment Dispersion

A referential pigment dispersion (36) was obtained by the similar operations as in Preparation Example 30 of the pigment dispersion described above, except for adding no azo compound (27).

Preparation Examples 4 to 6

For Referential Pigment Dispersions

Referential pigment dispersions (37) to (39) were obtained by the similar operations as in Preparation Examples 31 to 33 of the pigment dispersions described above, except for adding no azo compound (27), respectively.

Preparation Examples 1 to 4

For Comparative Pigment Dispersions

Comparative pigment dispersions (40) to (42) were obtained by the similar operations as in Preparation Example 1 of the pigment dispersion described above, except for altering the azo compound (27) in the Preparation Example 1 to the comparative azo compounds (55) to (57) described above, respectively.

A comparative pigment dispersion (43) was obtained by the similar operations as in Preparation Example 1 of the pigment dispersion described above, except for using a polymer dispersant "Solsperse 24000SC(R) (made by Lubrizol Corp.)" described in U.S. Pat. No. 7,582,152 and containing no chromophore in place of the azo compound (27).

<Evaluation of Pigment Dispersibility>

The pigment dispersibility by an azo compound was carried out by the gloss evaluation of coated films of pigment dispersions described above. That is, a pigment dispersion was scooped up by a dropper, put as a straight line on an art paper (trade name: Golden Cask Super Art, basis weight: 209.3 g/m$^2$, made by Oji Paper Co., Ltd.), coated uniformly on the art paper by using a wire bar (#10), and measured for the gloss (reflection angle: 60°) after drying by using a glossimeter GlossMeter VG2000 (made by Nippon Denshoku Industries Co., Ltd.). By utilizing the fact that a coated film was improved more in smoothness and improved more in gloss as a pigment was dispersed more finely, the gloss improvement factors of the coated films of the pigment dispersions (1) to (33) and the comparative pigment dispersions (40) to (43) described above were evaluated as follows using the gloss of the coated films of the referential pigment dispersions (34) to (39) as reference values.

A: the gloss improvement factor was 20% or more.
B: the gloss improvement factor was 10% or more and less than 20%.
C: the gloss improvement factor was 0% or more and less than 10%.
D: the gloss decreased.

If the gloss improvement factor was 10% or more, the pigment dispersibility was determined to be good.

The kinds of the pigment dispersions, the kinds of pigment dispersants, and the evaluation results of the pigment dispersibility of the pigment dispersions are shown in Table 3.

TABLE 3

PIGMENT DISPERSIONS USING THE AZO COMPOUNDS ACCORDING TO THE PRESENT INVENTION, AND EVALUATION RESULTS OF GLOSS

| Pigment Dispersion | Pigment Dispersant | Organic Solvent | Pigment | Gloss (60° gloss) |
|---|---|---|---|---|
| Pigment dispersion (1) | Azo compound (27) | Styrene | Formula (6) | A |
| Pigment dispersion (2) | Azo compound (28) | Styrene | Formula (6) | A |
| Pigment dispersion (3) | Azo compound (29) | Styrene | Formula (6) | A |
| Pigment dispersion (4) | Azo compound (30) | Styrene | Formula (6) | A |
| Pigment dispersion (5) | Azo compound (31) | Styrene | Formula (6) | A |
| Pigment dispersion (6) | Azo compound (32) | Styrene | Formula (6) | A |
| Pigment dispersion (7) | Azo compound (33) | Styrene | Formula (6) | A |
| Pigment dispersion (8) | Azo compound (34) | Styrene | Formula (6) | A |
| Pigment dispersion (9) | Azo compound (35) | Styrene | Formula (6) | A |
| Pigment dispersion (10) | Azo compound (36) | Styrene | Formula (6) | A |
| Pigment dispersion (11) | Azo compound (37) | Styrene | Formula (6) | A |
| Pigment dispersion (12) | Azo compound (38) | Styrene | Formula (6) | B |
| Pigment dispersion (13) | Azo compound (39) | Styrene | Formula (6) | B |

TABLE 3-continued

PIGMENT DISPERSIONS USING THE AZO COMPOUNDS ACCORDING TO THE
PRESENT INVENTION, AND EVALUATION RESULTS OF GLOSS

| Pigment Dispersion | Pigment Dispersant | Organic Solvent | Pigment | Gloss (60° gloss) |
|---|---|---|---|---|
| Pigment dispersion (14) | Azo compound (40) | Styrene | Formula (6) | B |
| Pigment dispersion (15) | Azo compound (41) | Styrene | Formula (6) | B |
| Pigment dispersion (16) | Azo compound (42) | Styrene | Formula (6) | B |
| Pigment dispersion (17) | Azo compound (43) | Styrene | Formula (6) | B |
| Pigment dispersion (18) | Azo compound (44) | Styrene | Formula (6) | B |
| Pigment dispersion (19) | Azo compound (45) | Styrene | Formula (6) | B |
| Pigment dispersion (20) | Azo compound (46) | Styrene | Formula (6) | A |
| Pigment dispersion (21) | Azo compound (47) | Styrene | Formula (6) | B |
| Pigment dispersion (22) | Azo compound (48) | Styrene | Formula (6) | B |
| Pigment dispersion (23) | Azo compound (49) | Styrene | Formula (6) | A |
| Pigment dispersion (24) | Azo compound (50) | Styrene | Formula (6) | B |
| Pigment dispersion (25) | Azo compound (51) | Styrene | Formula (6) | B |
| Pigment dispersion (26) | Azo compound (52) | Styrene | Formula (6) | B |
| Pigment dispersion (27) | Azo compound (53) | Styrene | Formula (6) | B |
| Pigment dispersion (28) | Azo compound (54) | Styrene | Formula (6) | B |
| Pigment dispersion (29) | Azo compound (33) | Butyl acrylate | Formula (6) | A |
| Pigment dispersion (30) | Azo compound (27) | Toluene | Formula (6) | A |
| Pigment dispersion (31) | Azo compound (27) | Styrene | Formula (58) | B |
| Pigment dispersion (32) | Azo compound (27) | Styrene | Formula (59) | B |
| Pigment dispersion (33) | Azo compound (27) | Styrene | Formula (60) | B |
| Referential pigment dispersion (34) | None | Styrene | Formula (6) | — |
| Referential pigment dispersion (35) | None | Butyl acrylate | Formula (6) | — |
| Referential pigment dispersion (36) | None | Toluene | Formula (6) | — |
| Referential pigment dispersion (37) | None | Styrene | Formula (58) | — |
| Referential pigment dispersion (38) | None | Styrene | Formula (59) | — |
| Referential pigment dispersion (39) | None | Styrene | Formula (60) | — |
| Comparative pigment dispersion (40) | Comparative azo compound (55) | Styrene | Formula (6) | D |
| Comparative pigment dispersion (41) | Comparative azo compound (56) | Styrene | Formula (6) | C |
| Comparative pigment dispersion (42) | Comparative azo compound (57) | Styrene | Formula (6) | C |
| Comparative pigment dispersion (43) | Solsperse24000SC | Styrene | Formula (6) | D |

(In Table 3, "—" denotes a reference value for evaluation.)

From Table 3, it is found that any of the pigment dispersions (1) to (33) using the azo compounds (27) to (54) according to the present invention exhibited more improved pigment dispersibility than the referential pigment dispersions (34) to (39). From this result, it is confirmed that the azo compound according to the present invention is useful as a pigment dispersant. It is also confirmed particularly for the pigment of the formula (6) shown above that in the case where one of Resins A to I described above was bonded to $R_4$ in the general formula (1) shown above; $R_1$ was a methyl group; and $R_7$ and $R_{10}$ were each one of a $COOCH_3$ group, a $CONHCH_3$ group and a $CON(CH_3)_2$ group, the pigment dispersibility was likely to be improved remarkably.

From comparison of the pigment dispersion (1) using the azo compound (27) according to the present invention with the comparative pigment dispersion (40) using the comparative azo compound (55), it is confirmed that the colorant site according to the present invention largely contributed to the improvement in the pigment dispersibility for the pigment of the formula (6) shown above.

From comparison of the pigment dispersion (14) using the azo compound (40) according to the present invention with the comparative pigment dispersion (41) using the comparative azo compound (56), and comparison of the pigment dispersion (26) using the azo compound (52) according to the present invention with the comparative pigment dispersion (42) using the comparative azo compound (57), it is confirmed that the substitution of the copolymer on the $R_1$ and $R_9$ positions decreased the pigment dispersibility.

From comparison of the pigment dispersion (1) using the azo compound (27) according to the present invention with the pigment dispersions (12) and (13) using the azo compound (38) and (39) according to the present invention, it is confirmed that the substitution of the copolymer on the $R_4$ position is optimal.

From comparison of the comparative pigment dispersion (43) using a commercially available pigment dispersant with the pigment dispersion according to the present invention, it is confirmed that the azo compound according to the present invention contributes largely to the improvement in the pigment dispersibility.

Preparation Example 34

For a Pigment Dispersion>

42.0 parts of the pigment represented by the formula (6) shown above as an azo pigment and 8.4 parts of the azo compound described above as a pigment dispersant were dry mixed by a hybridization system, NHS-0 (made by Nara Machinery Co., Ltd.) to prepare a pigment composition.

18.0 parts of the obtained pigment composition was mixed with 180 parts of styrene, and dispersed with an attritor (made by Nippon Coke & Engineering Co., Ltd.) for one hour, and filtered with a mesh to obtain a pigment dispersion.

The obtained pigment dispersion was evaluated for the pigment dispersibilty as described above, and it was confirmed that the good pigment dispersibility was acquired similarly.

Example 3

Production Example 1

For a Yellow Toner (Preparation of an Aqueous Medium)

710 parts of ion exchange water and 450 parts of a 0.1-mol/l $Na_3PO_4$ aqueous solution were added in a 2-L four-necked flask equipped with a high-speed stirrer TK Homo Mixer [made by Primix Corp.], whose rotation frequency was regulated at 12,000 rpm, and the mixture was heated at 60° C. 68 parts of a 1.0-mol/l CaCl₂ aqueous solution was gradually added thereto to prepare an aqueous medium containing a fine hardly water-soluble dispersion stabilizer $Ca_3(PO_4)_2$.
(Suspension Polymerization Step)

| | |
|---|---|
| The pigment dispersion (1) described above | 132.0 parts |
| Styrene | 46.0 parts |
| n-Butyl acrylate | 34.0 parts |
| A polar resin [a saturated polyester resin (terephthalic acid-propylene oxide-modified bisphenol A, the acid value: 15 mgKOH/g, the peak molecular weight: 6,000)] | 10.0 parts |
| An ester wax (the maximum endothermal peak in DSC measurement = 70° C., Mn = 704) | 25.0 parts |
| An aluminum salicylate compound (trade name: Bontron E-88, made by Orient Chemical Industries, Ltd.) | 2.0 parts |
| Divinylbenzene | 0.1 parts |

The composition described above was heated at 60° C., and homogeneously dissolved and dispersed using a high-speed stirrer TK Homo Mixer [made by Premix Corp.] at 5,000 rpm. 10.0 parts of 2,2'-azobis(2,4-dimethylvaleronitrile) as a polymerization initiator was added thereto, and charged in the aqueous medium described above; and the mixture was granulated for 15 min while the rotation frequency was maintained at 12,000 rpm. Thereafter, the stirrer was altered from the high-speed stirrer to propeller stirring blades, and the polymerization was continued at a liquid temperature of 60° C. for 5 hours; and thereafter, the liquid temperature was raised to 80° C., and the polymerization was continued for 8 hours. After the completion of the polymerization reaction, the remaining monomers were distilled out at 80° C. under reduced pressure, and the resultant was then cooled to 30° C. to obtain a polymer fine particle dispersion liquid.
(Cleaning Step and Drying Step)

Then, the polymer fine particle dispersion liquid was transferred to a cleaning vessel; a dilute hydrochloric acid was added under stirring to the dispersion liquid, which was stirred at pH of 1.5 for 2 hours to dissolve a compound of phosphoric acid and calcium containing $Ca_3(PO_4)_2$; and thereafter, the dispersion liquid was subjected to a solid-liquid separation by a filter to obtain polymer fine particles. This was charged in water, and stirred to again make a dispersion liquid, which was then subjected to a solid-liquid separation by a filter. The redispersion of the polymer fine particles in water and the solid-liquid separation were repeated until the compound of phosphoric acid and calcium containing $Ca_3(PO_4)_2$ was sufficiently removed. Thereafter, the polymer fine particles finally having been subjected to the solid-liquid separation was fully dried in a drier to obtain yellow toner particles.

1.0 part of a hydrophobic silica fine powder (having a number-average primary particle diameter of 7 nm) surface-treated with hexamethyldisilazane, 0.15 parts of a rutile-type titanium oxide fine powder (having a number-average primary particle diameter of 45 nm) and 0.5 parts of a rutile-type titanium oxide fine powder (having a number-average primary particle diameter of 200 nm) with respect to 100 parts of the obtained yellow toner particles were dry mixed for 5 min by a Henschel mixer [made by Nippon Coke & Engineering Co., Ltd.] to obtain a yellow toner (1).

Production Examples 2 to 28

For Yellow Toners

The yellow toners (2) to (28) according to the present invention were obtained as in Production Example 1 of a yellow toner, except for altering the pigment dispersion (1) described above to the pigment dispersions (2) to (28) described above, respectively.

Production Examples 29 to 31

For Yellow Toners

The yellow toners (29) to (31) according to the present invention were obtained as in Production Example 1 of a yellow toner, except for altering the pigment dispersion (1) described above to the pigment dispersions (31) to (33) described above, respectively.

Production Example 32

For a Yellow Toner (Preparation of a Pigment Dispersion)

| | |
|---|---|
| Ethyl acetate | 180.0 parts |
| The coloring agent of the formula (6) shown above | 12.0 parts |

Formula (6)

| | |
|---|---|
| The azo compound (27) | 2.4 parts |

The materials described above were dispersed for 3 hours with an attritor [Nippon Coke & Engineering Co., Ltd.] to prepare a pigment dispersion (44).
(Mixing Step)

| | |
|---|---|
| The pigment dispersion liquid (44) | 96.0 parts |
| A polar resin [saturated polyester resin (a polycondensate of a propylene oxide-modified bisphenol A and phthalic acid, Tg = 75.9° C., Mw = 11,000, Mn = 4,200, and the acid value = 11 mgKOH/g)] | 85.0 parts |

-continued

| | |
|---|---|
| A hydrocarbon wax (a Fischer-Tropsch wax, the maximum endothermic peak in DSC measurement = 80° C., and Mw = 750) | 9.0 parts |
| An aluminum salicylate compound [trade name: Bontron E-88, made by Orient Chemical Industries, Ltd.) | 2.0 parts |
| Ethyl acetate (solvent) | 10.0 parts |

The composition described above was dispersed for 24 hours in a ball mill to obtain 200 parts of a toner composition mixed liquid.
(Dispersion Suspension Step)

| | |
|---|---|
| Calcium carbonate (coated with an acrylic copolymer) | 20.0 parts |
| A carboxymethylcellulose [trade name: Cellogen BS-H, made by Daiichi Kogyo Seiyaku Co., Ltd.] | 0.5 parts |
| Ion exchange water | 99.5 parts |

The composition described above was dispersed for 24 hours in a ball mill to dissolve the carboxymethylcellulose, to thereby obtain an aqueous medium. 1,200 parts of the aqueous medium was charged in a high-speed stirrer TK Homo Mixer [made by Primix Corp.]; 1,000 parts of the toner composition mixed liquid described above was charged while the aqueous medium was being stirred by the rotation blades of the stirrer at a peripheral speed of 20 m/sec, and stirred for 1 min with the temperature being maintained at a constant of 25° C., to thereby obtain a suspension.
(Solvent Removal Step)
While 2,200 parts of the suspension obtained in the dispersion suspension step was being stirred by a Fullzone impeller [made by Kobelco Eco-Solutions Co., Ltd.] at a peripheral speed of 45 m/min, and the liquid temperature was being kept constant at 40° C., the gas phase above the suspension surface was forcibly renewed by using a blower to start removing the solvent. At 15 min after the start of the solvent removal, 75 parts of an ammonia water diluted to 1% as an ionic substance was added; then at 1 hour after the start of the solvent removal, 25 parts of the ammonia water was added; then, at 2 hours after the start of the solvent removal, 25 parts of the ammonia water was added; and finally, at 3 hours after the start of the solvent removal, 25 parts of the ammonia water was added, wherein the total addition amount of the ammonia water was 150 parts. Further with the liquid temperature being maintained at 40° C., the suspension was held for 17 hours after the start of the solvent removal to thereby obtain a toner dispersion liquid in which the solvent (ethyl acetate) had been removed from suspension particles.
(Cleaning and Dehydration Step) 80 parts of a 10-mol/l hydrochloric acid was added to 300 parts of the toner dispersion liquid obtained in the solvent removal step, and further subjected to a neutralization treatment with a 0.1-mol/l sodium hydroxide aqueous solution; and thereafter, cleaning with ion exchange water by suction filtration was repeated four times to obtain a toner cake. The obtained toner cake was dried by a vacuum drier, and screened by a sieve having a sieve opening of 45 μm to thereby obtain yellow toner particles. The subsequent steps were carried out as in Production Example 1 of a yellow toner described above to thereby obtain a yellow toner (32).

Production Examples 33 to 59

For Yellow Toners

The yellow toners (33) to (59) according to the present invention were obtained as in Production Example 32 of a yellow toner described above, except for altering the azo compound (27) to the azo compounds (28) to (54), respectively.

Production Examples 60 to 62

For Yellow Toners

The yellow toners (60) to (62) according to the present invention were obtained as in Production Example 32 of a yellow toner described above, except for altering the coloring agent of the formula (6) shown above to the formulae (58) to (60) shown above, respectively.

Production Examples 1 to 4

For Referential Yellow Toners

Referential yellow toners (63) to (66) were obtained as in Production Example 1 of a yellow toner, except for altering the pigment dispersion (1) described above to the referential pigment dispersion (34) and the referential pigment dispersions (37) to (39) described above, respectively.

Production Examples 1 to 4

For Comparative Yellow Toners

Comparative yellow toners (67) to (70) were obtained as in Production Example 1 of a yellow toner, except for altering the pigment dispersion (1) described above to the comparative pigment dispersions (40) to (43), respectively.

Production Example 5

For a Referential Yellow Toner

A referential yellow toner (71) was obtained as in Production Example 32 of a yellow toner, except for adding no azo compound (27) described above.

Production Examples 6 to 8

For Referential Yellow toners

Referential yellow toners (72) to (74) were obtained as in Production Examples 60 to 62 of yellow toners described above, except for adding no azo compound (27), respectively.

Production Examples 5 to 8

For Comparative Yellow Toners

Comparative yellow toners (75) to (78) were obtained as in Production Example 32 of a yellow toner described above, except for altering the azo compound (27) described above to the azo compounds (55) to (57) and "Solsperse 24000SC(R) (made by Lubrizol Corp.)", respectively.
<Evaluation Examples of the Color Tone of the Yellow Toners>
For the yellow toners (1) to (78), 95 parts of a ferrite carrier coated with an acrylic resin was mixed with 5 parts of the each yellow toner to make a developer. The image output was carried out using a color copying machine from which the fixing oil-coating mechanism had been dismounted, a CLC-1100 remodeled machine (made by Canon Corp.), under the environment of a temperature of 25° C. and a humidity of 60% RH. Then, the image was measured for L* and C* in the L*a*b* colorimetric system prescribed by Commission Internationale del'Eclairage by using a reflective densitometer, Spectrolino (made by GretagMacbeth Co.) under the conditions of a light source of D50 and a visual field of 2°. The color tone of a toner was evaluated as an improvement factor of C* at L*=95.5.

The improvement factors of C*s of images of the yellow toners (1) to (31) and the comparative yellow toners (67) to (70) described above used C*s of images of the referential yellow toners (63) to (66) as reference values.

The improvement factors of C*s of images of the yellow toners (32) to (62) and the comparative yellow toners (75) to (78) described above used C*s of images of the referential yellow toners (71) to (74) as reference values.

The evaluation standard was as follows.
A: the improvement factor was 5% or more.
B: the improvement factor was 1% or more and less than 5%.
C: the improvement factor was 0% or more and less than 1%
D: C* decreased.

If the improvement factor of C* was 1% or more, the evaluation was determined to be as good.

The kinds of the yellow toners and the color tone evaluation results of the yellow toners are shown in Table 4 (suspension polymerization method) and Table 5 (suspension granulation method).

TABLE 4

EVALUATION RESULTS OF TONERS USING AZO COMPOUNDS OF THE PRESENT INVENTION AND COMPARATIVE TONERS (SUSPENSION POLYMERIZATION METHOD)

| Yellow Toner | Pigment Dispersant | Pigment | Chroma (C*) |
|---|---|---|---|
| Toner (1) | Azo compound (27) | Formula (6) | A |
| Toner (2) | Azo compound (28) | Formula (6) | A |
| Toner (3) | Azo compound (29) | Formula (6) | A |
| Toner (4) | Azo compound (30) | Formula (6) | A |
| Toner (5) | Azo compound (31) | Formula (6) | A |
| Toner (6) | Azo compound (32) | Formula (6) | A |
| Toner (7) | Azo compound (33) | Formula (6) | A |
| Toner (8) | Azo compound (34) | Formula (6) | A |
| Toner (9) | Azo compound (35) | Formula (6) | A |
| Toner (10) | Azo compound (36) | Formula (6) | A |
| Toner (11) | Azo compound (37) | Formula (6) | A |
| Toner (12) | Azo compound (38) | Formula (6) | B |
| Toner (13) | Azo compound (39) | Formula (6) | B |
| Toner (14) | Azo compound (40) | Formula (6) | B |
| Toner (15) | Azo compound (41) | Formula (6) | B |
| Toner (16) | Azo compound (42) | Formula (6) | B |
| Toner (17) | Azo compound (43) | Formula (6) | B |
| Toner (18) | Azo compound (44) | Formula (6) | B |
| Toner (19) | Azo compound (45) | Formula (6) | B |
| Toner (20) | Azo compound (46) | Formula (6) | A |
| Toner (21) | Azo compound (47) | Formula (6) | B |
| Toner (22) | Azo compound (48) | Formula (6) | B |
| Toner (23) | Azo compound (49) | Formula (6) | A |
| Toner (24) | Azo compound (50) | Formula (6) | B |
| Toner (25) | Azo compound (51) | Formula (6) | B |
| Toner (26) | Azo compound (52) | Formula (6) | B |
| Toner (27) | Azo compound (53) | Formula (6) | B |
| Toner (28) | Azo compound (54) | Formula (6) | B |
| Toner (29) | Azo compound (27) | Formula (58) | B |
| Toner (30) | Azo compound (27) | Formula (59) | B |
| Toner (31) | Azo compound (27) | Formula (60) | B |
| Referential toner (63) | None | (Formula6) | — |
| Referential toner (64) | None | Formula (58) | — |
| Referential toner (65) | None | Formula (59) | — |
| Referential toner (66) | None | Formula (60) | — |
| Comparative toner (67) | Comparative azo compound (55) | Formula (6) | D |
| Comparative toner (68) | Comparative azo compound (56) | Formula (6) | C |
| Comparative toner (69) | Comparative azo compound (57) | Formula (6) | C |
| Comparative toner (70) | Solsperse24000SC | Formula (6) | D |

TABLE 5

EVALUATION RESULTS OF TONERS USING AZO COMPOUNDS OF THE PRESENT INVENTION AND COMPARATIVE TONERS (SUSPENSION GRANULATION METHOD)

| Yellow Toner | Pigment Dispersant | Pigment | Chroma (C*) |
|---|---|---|---|
| Toner (32) | Azo compound (27) | Formula (6) | A |
| Toner (33) | Azo compound (28) | Formula (6) | A |
| Toner (34) | Azo compound (29) | Formula (6) | A |
| Toner (35) | Azo compound (30) | Formula (6) | A |
| Toner (36) | Azo compound (31) | Formula (6) | A |
| Toner (37) | Azo compound (32) | Formula (6) | A |
| Toner (38) | Azo compound (33) | Formula (6) | A |
| Toner (39) | Azo compound (34) | Formula (6) | A |
| Toner (40) | Azo compound (35) | Formula (6) | A |
| Toner (41) | Azo compound (36) | Formula (6) | A |
| Toner (42) | Azo compound (37) | Formula (6) | A |
| Toner (43) | Azo compound (38) | Formula (6) | B |
| Toner (44) | Azo compound (39) | Formula (6) | B |
| Toner (45) | Azo compound (40) | Formula (6) | B |
| Toner (46) | Azo compound (41) | Formula (6) | B |
| Toner (47) | Azo compound (42) | Formula (6) | B |
| Toner (48) | Azo compound (43) | Formula (6) | B |
| Toner (49) | Azo compound (44) | Formula (6) | B |
| Toner (50) | Azo compound (45) | Formula (6) | B |
| Toner (51) | Azo compound (46) | Formula (6) | A |
| Toner (52) | Azo compound (47) | Formula (6) | B |
| Toner (53) | Azo compound (48) | Formula (6) | B |
| Toner (54) | Azo compound (49) | Formula (6) | A |
| Toner (55) | Azo compound (50) | Formula (6) | B |
| Toner (56) | Azo compound (51) | Formula (6) | B |
| Toner (57) | Azo compound (52) | Formula (6) | B |
| Toner (58) | Azo compound (53) | Formula (6) | B |
| Toner (59) | Azo compound (54) | Formula (6) | B |
| Toner (60) | Azo compound (27) | Formula (58) | B |
| Toner (61) | Azo compound (27) | Formula (59) | B |
| Toner (62) | Azo compound (27) | Formula (60) | B |
| Referential toner (71) | None | (Formula6) | — |
| Referential toner (72) | None | Formula (58) | — |
| Referential toner (73) | None | Formula (59) | — |
| Referential toner (74) | None | Formula (60) | — |
| Comparative toner (75) | Comparative azo compound (55) | Formula (6) | D |
| Comparative toner (76) | Comparative azo compound (56) | Formula (6) | C |
| Comparative toner (77) | Comparative azo compound (57) | Formula (6) | C |
| Comparative toner (78) | Solsperse24000SC | Formula (6) | D |

From Table 4 and Table 5, it is found that a toner using the azo compound according to the present invention as a pigment dispersant has a high chroma and a good color tone. Therefrom, it is confirmed that the azo compound according to the present invention is useful as a pigment dispersant for a toner.

INDUSTRIAL APPLICABILITY

The azo compound according to the present invention is particularly suitably used as a dispersant to disperse an azo pigment in a water-insoluble solvent. Additionally, the azo compound according to the present invention not only is used as a pigment dispersant, but also can be used as a colorant for electrophotographic toners, inkjet inks, thermosensitive transfer recording sheets, coloring agents for color filters and optical recording media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-190325, filed Aug. 27, 2010, which is hereby incorporated by reference herein in its entirety.

The invention claimed is:

1. An azo compound, being represented by the following general formula (1):

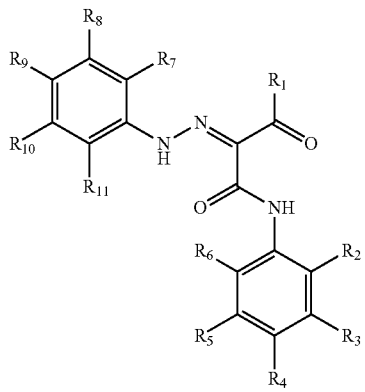

General formula (1)

wherein $R_1$ represents an alkyl group having 1 to 6 carbon atoms, or a phenyl group;

$R_2$ to $R_6$ each represent a hydrogen atom, or a polymer containing a partial structural formula represented by the general formula (2) shown below, and at least one of R2 to R6 is the polymer;

$R_7$ to $R_{11}$ each represent a hydrogen atom, a $COOR_{12}$ group, or a $CONR_{13}R_{14}$ group, and at least one of $R_7$ to $R_{11}$ is a $COOR_{12}$ group, or a $CONR_{13}R_{14}$ group; and $R_{12}$ to $R_{14}$ each represent a hydrogen atom, or an alkyl group having 1 to 3 carbon atoms:

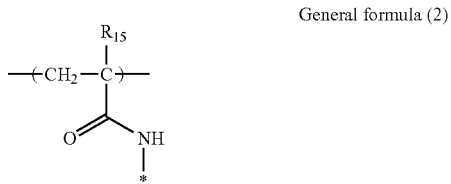

General formula (2)

wherein $R_{15}$ represents a hydrogen atom, or an alkyl group having 1 or 2 carbon atoms; and

* is a bonding position through which the polymer is bonded to the azo compound as $R_2$ to $R_6$ in the general formula (1).

2. The azo compound according to claim 1, wherein the polymer has a partial structure represented by the general formula (4) or the general formula (5):

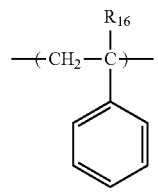

General formula (4)

wherein $R_{16}$ represents a hydrogen atom, or an alkyl group having 1 or 2 carbon atoms, and

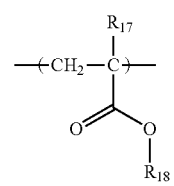

General formula (5)

wherein $R_{17}$ represents a hydrogen atom, or an alkyl group having 1 or 2 carbon atoms; and $R_{18}$ represents an alkyl group having 1 to 22 carbon atoms, or an aralkyl group having 7 or 8 carbon atoms.

3. The azo compound according to claim 1, wherein $R_1$ in the general formula (1) is a methyl group.

4. The azo compound according to claim 1, wherein $R_7$ and $R_{10}$ in the general formula (1) are each a $COOR_{12}$ group ($R_{12}$ is a hydrogen atom, or an alkyl group having 1 to 3 carbon atoms); and $R_8$, $R_9$ and $R_{11}$ are each a hydrogen atom.

5. The azo compound according to claim 4, wherein $R_{12}$ in the general formula (1) is a methyl group.

6. The azo compound according to claim 1, wherein any one of $R_7$ to $R_{13}$ in the general formula (1) is a $CONR_{13}R_{14}$ group; $R_{13}$ is a methyl group; and $R_{14}$ is a hydrogen atom, or a methyl group.

7. A pigment dispersant comprising an azo compound according to claim 1.

8. A pigment composition comprising a pigment dispersant according to claim 7, and an azo pigment.

9. The pigment composition according to claim 8, wherein the azo pigment is an acetoacetanilide-based pigment.

10. The pigment composition according to claim 8, wherein the azo pigment is a compound represented by the following formula (6):

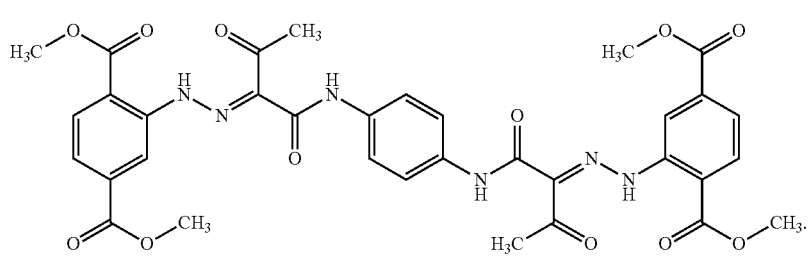

Formula (6)

11. A pigment dispersion comprising a pigment composition according to claim 8, and a water-insoluble solvent as a dispersion medium.

12. The pigment dispersion according to claim 11, wherein the water-insoluble solvent is a styrene monomer.

13. A toner comprising toner particles comprising a binder resin, a coloring agent and a wax component, wherein the coloring agent is a pigment composition according to claim 8.

14. The toner according to claim 13, wherein the toner particles are produced using a suspension polymerization method or a suspension granulation method in an aqueous medium.

* * * * *